United States Patent [19]

Igata

[11] Patent Number: 5,963,942
[45] Date of Patent: Oct. 5, 1999

[54] PATTERN SEARCH APPARATUS AND METHOD

[75] Inventor: Nobuyuki Igata, Kawasaki, Japan

[73] Assignee: Fujitsu Limited, Kawasaki, Japan

[21] Appl. No.: 08/773,295

[22] Filed: Dec. 24, 1996

[30]     Foreign Application Priority Data

Jan. 16, 1996   [JP]   Japan ................................. 8-005236

[51] Int. Cl.⁶ .................................................. G06F 17/30
[52] U.S. Cl. ............................ 707/6; 707/3; 707/5; 707/7
[58] Field of Search ................................... 707/3, 6, 7, 5; 395/800.19; 345/326

[56]           References Cited

U.S. PATENT DOCUMENTS

| | | | |
|---|---|---|---|
| 4,916,655 | 4/1990 | Ohsone | 707/6 |
| 4,991,087 | 2/1991 | Burkowski | 707/3 |
| 5,440,482 | 8/1995 | Davis | 707/6 |
| 5,544,049 | 8/1996 | Henderson | 707/7 |
| 5,675,819 | 10/1997 | Schuetze | 707/3 |
| 5,680,612 | 10/1997 | Asada | 707/3 |

OTHER PUBLICATIONS

Robert S. Boyer et al., "A Fast String Searching Algorithm", Communications of the ACM, vol. 20, No. 10, Oct., 1977, pp. 762–772.

Alfred V. Aho et al., "Efficient String Matching: An Aid to Bibliographic Search", Communications of the ACM, vol. 18, No. 6, Jun., 1975, pp. 333–340.

Daniel M. Sunday, "A Very Fast Substring Search Algorithm", Communications of the ACM, vol. 33, No. 8, Aug., 1990, pp. 133–143.

N. Uratani, "A Fast Algorithm for Matching Multiple Patterns", Transactions of Information Processing Society of Japan, vol. 30, No. 9, Sep. 1989, pp. 1120–1123.

*Primary Examiner*—Thomas G. Black
*Assistant Examiner*—Diane D. Mizrahi
*Attorney, Agent, or Firm*—Staas & Halsey, LLP

[57]          ABSTRACT

A search method selecting unit included in a pattern search apparatus can automatically select a search method with the highest search speed from a plurality of search methods according to the number of search patterns, form, etc., in order to find a search pattern in a search target. An optimum search or replacement can be realized by finding or replacing the search pattern using the selected method.

29 Claims, 35 Drawing Sheets

| i | output(i) |
|---|---|
| 2 | {he} |
| 5 | {she, he} |
| 7 | {his} |
| 9 | {hers} |

| i | 1 | 2 | 3 | 4 | 5 | 6 | 7 | 8 | 9 |
|---|---|---|---|---|---|---|---|---|---|
| f(i) | 0 | 0 | 0 | 1 | 2 | 0 | 3 | 0 | 3 |

| % time | self seconds | calls | self ms/call | total ms/call | name |
|---|---|---|---|---|---|
| 62.5 | 1.85 | 183 | 10.11 | 10.11 | _read [10] |
| 35.1 | 1.04 | 475 | 2.19 | 2.19 | _bm_engine [9] |

FIG. 6A

| % time | self seconds | calls | self ms/call | total ms/call | name |
|---|---|---|---|---|---|
| 85.1 | 11.57 | 226 | 51.20 | 51.20 | _ac_engine [6] |
| 13.8 | 1.88 | 183 | 10.27 | 10.27 | _read [10] |

FIG. 6B

| LENGTH OF SHORTEST CHARACTER STRING TO BE SEARCHED | BOUNDARY NUMBER OF CHARACTER STRINGS TO BE SEARCHED |
|---|---|
| 2 (bytes) | 35.00 (STRINGS) |
| 3 | 45.43 |
| 4 | 54.67 |
| 5 | 62.43 |
| 6 | 69.19 |
| 7 | 76.08 |
| 8 | 85.01 |
| 9 | 98.54 |
| 10 | 119.98 |

FIG. 14

| LENGTH OF SHORTEST CHARACTER STRING TO BE SEARCHED | BOUNDARY NUMBER OF CHARACTER STRINGS TO BE SEARCHED |
|---|---|
| 2 (bytes) | 45.58 (STRINGS) |
| 3 | 57.41 |
| 4 | 63.20 |
| 5 | 66.61 |
| 6 | 71.40 |
| 7 | 81.31 |
| 8 | 100.00 |
| 9 | 131.51 |

FIG. 18

| LENGTH OF SHORTEST CHARACTER STRING TO BE SEARCHED | BOUNDARY NUMBER OF CHARACTER STRINGS TO BE SEARCHED |
| --- | --- |
| 2 (bytes) | 25.16 (STRINGS) |
| 3 | 32.08 |
| 4 | 39.97 |
| 5 | 51.55 |
| 6 | 68.32 |
| 7 | 90.42 |
| 8 | 116.76 |
| 9 | 144.91 |
| 10 | 171.16 |

FIG. 22

| LENGTH OF SHORTEST CHARACTER STRING TO BE SEARCHED | BOUNDARY NUMBER OF CHARACTER STRINGS TO BE SEARCHED |
|---|---|
| 2 (bytes) | 35.63 (STRINGS) |
| 3 | 75.23 |
| 4 | 114.11 |
| 5 | 150.08 |
| 6 | 186.81 |
| 7 | 229.78 |
| 8 | 282.45 |
| 9 | 342.16 |
| 10 | 396.30 |

FIG. 26

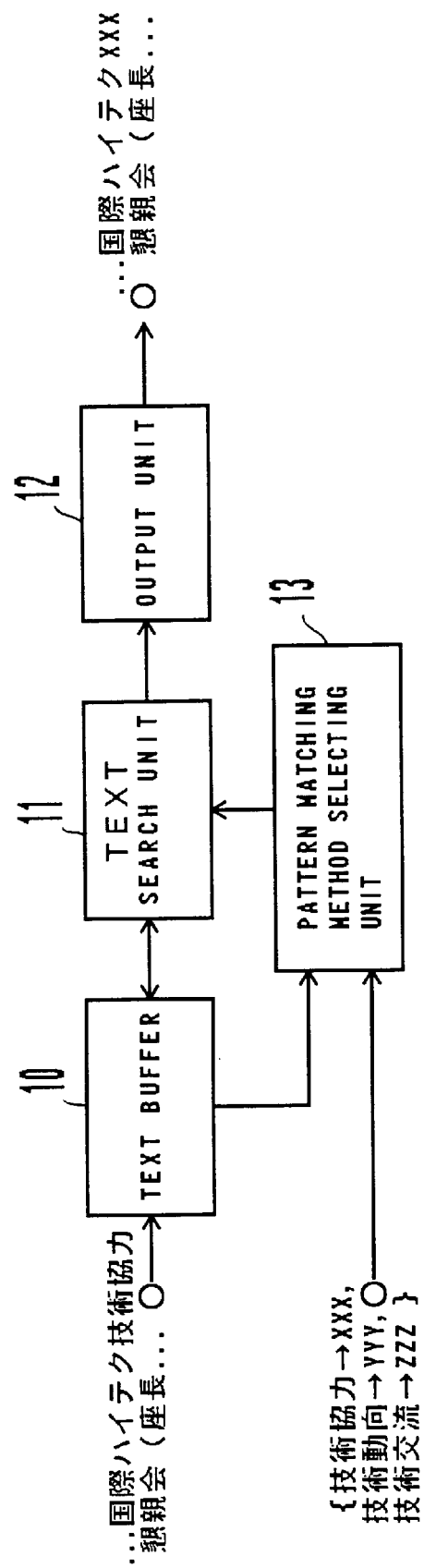
F I G. 3 2 A

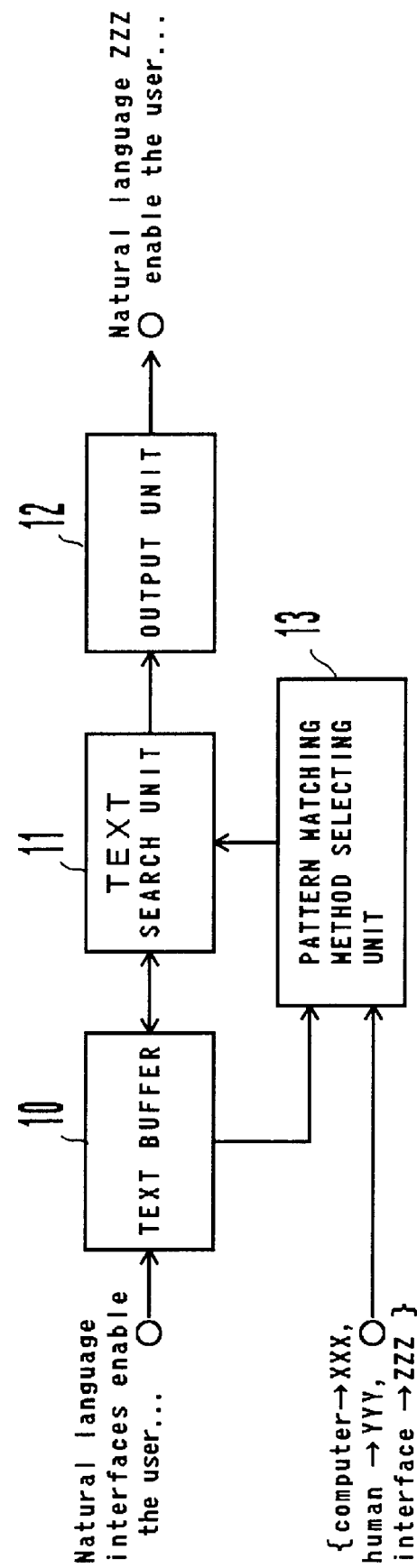
F I G. 33A

[Natural language interfaces enable the user to communicate with the computer in German, English or another human language. Some applications of such interfaces are database queries, information retrieval from texts and so-called expert systems. ...]

FIG. 33B

PATTERN SEARCH APPARATUS AND METHOD

BACKGROUND OF THE INVENTION

1. Field of the Invention

The present invention relates to a pattern search apparatus and method for finding a search pattern in a search target, and more particularly to a character string search apparatus and method for searching a character string to be searched, that is, a keyword, for character strings as text.

2. Description of the Related Art

As information has been put into an electronic form in recent years, the demand for a pattern search apparatus for finding a pattern in information put into the electronic form becomes greater. Especially, as coded text increases, the degree of importance of the character string search apparatus becomes greater.

Furthermore, user needs vary with the increase of information such as text, etc. readable by machine. To satisfy such varying user needs, the demand for improving search speed becomes greater, in correspondence with a search condition such as the number of search patterns, the number of keywords, lengths of the search patterns or keywords, etc.

For example, in a conventional character string search apparatus, one of the following character string search methods is employed to search a character string depending on a use purpose of the conventional character string search apparatus.

The first method is the Boyer-Moore method (abbreviated to the BM method hereinafter), which can perform an efficient search in the case where the number of keywords is only one. The following document refers to this method.

Boyer R. S. Moore J. S.: A Fast String Searching Algorithm, CACM Vol.20 No.10, pp.762 (1977)

Provided here is the explanation about a search implemented by the BM method by referring to a specific example. Let's consider the case where a keyword "AT-THAT" is searched for in an English text, as a target. With the BM method, the keyword is first corresponded to the text, so that the first character of the keyword is aligned with the beginning of the text. Then, a first comparison is made between a character "F" of the text and the last character of the keyword (as indicated by an arrow, below). This state is as shown below.

```
        AT — THAT
TEXT: WHICH— FINALLY— HALTS. -- AT — THAT POINT. . .
             ↑
```

Since the character "F" of the text does not exist in the keyword as a result of the comparison, the keyword is shifted to the right by 7 characters (the length of the keyword), without making a comparison between the 6 characters preceding the last character "T" of the keyword and the corresponding characters of the text. This state is as shown below.

```
                AT — THAT
TEXT: WHICH— FINALLY— HALTS. --AT—THAT— POINT. . .
                    ↑
```

Next, comparison is made between a dash "-" at a location corresponding to the last character of the keyword in the text, and the characters of the keyword. As a result, the dash "-" in the text is included as the third character from the beginning of the keyword (fifth character from the end), the keyword is shifted to the right by four characters. This state is shown below.

```
                    AT — THAT
TEXT: WHICH— FINALLY— HALTS. --AT - THAT - POINT..
                        ↑
```

Since the last character of the keyword matches the corresponding character of the text, comparison is made between the preceding characters in the keyword and the text. The character "L" preceding the character "T" in the text is not included in the keyword. Accordingly, the keyword is shifted to the right by 6 characters from the above described state, so that the end of the keyword corresponds to the location shifted right by 7 characters from the character "L". This state is as shown below.

```
                          AT — THAT
TEXT: WHICH— FINALLY— HALTS. --AT—THAT— POINT. . .
                              ↑
```

Although the last character and its preceding character of the keyword "AT" match characters positioned at the corresponding locations in the text, no match is found between the other preceding characters in the keyword and the text. Therefore, the keyword is shifted to the right by five characters, and a similar comparison is made. As a result of the comparison, all of the characters in the keyword match the corresponding characters in the text, which leads to finding the keyword in the text.

```
                               AT — THAT
TEXT: WHICH— FINALLY— HALTS.— AT—THAT— POINT. . .
                                   ↑
```

As described above, the amount of shifting of a keyword to the right using the BM method is determined by a location of a character in the text at which a mismatch with the keyword itself is found. A table indicating the amount of shifting of the keyword to the right may be prepared beforehand to search a character string.

The second method is the Aho-Corasick method (abbreviated to the AC method hereinafter) effective for the case where there are a plurality of keywords. The document referring to this method is given below.

Aho. A. V. Corasick M. J.: Efficient String Matching: An Aid to Bibliographic Search, CACM, Vol.18, No.6, pp.333 (1975)

With the AC method, a state transition diagram of a plurality of keywords is made for a search. The search is performed character by character from the beginning of the text, based on the state transition diagram. The search result is output when the keyword is ready to be output.

FIG. 1 is a schematic diagram exemplifying a keyword search according to the AC method. FIG. 1A is a schematic diagram explaining state transition in the case where there are four keywords such as "he", "she", "his", and "hers". A certain state, "0" in this case, is an initial state, and the state shifts to "1" if an "h" is detected. If an "s" is detected, this state shifts to "3". The state transition is made according to the state transition diagram. As shown in FIG. 1B, the result of the keyword detection is output when the state reaches the state "2", "5", "7", or "9".

FIG. 1C shows destinations of a "failure" function, that is, a state transition in the case where a target character is not detected. For example, if the state is "1" (i=1) and neither an "e" nor an "i" is detected, the state shifts to "0" (f(1)=0). If the "e" is not detected in the state "4", the state shifts to "1" (f(4)=1) in order to determine whether or not an "i" is detected. The state shifts to "2" (f(5)=2) in order to determine whether or not an "r" is detected (that is, whether or not "her" is detected), after "she" is detected in the state 5.

With such a state transition, a search based on a plurality of keywords is performed according to the AC method.

The third search method is the FAST method, implemented by combining both the matching from the right of a keyword according to the BM method and the simultaneous matching of a plurality of keywords using a state transition diagram according to the AC method.

FIG. 2 is a schematic diagram exemplifying a keyword search implemented with the FAST method. In this figure, search is performed for text using three keywords such as "state", "east", and "smart". Unlike the case shown in FIG. 1A, a state does not shift from left to right of a keyword, but shifts from right to left of the keyword in a state transition diagram (not shown in the drawing) according to the FAST method.

After such a state transition diagram is created, part of the text corresponding to the length of the shortest keyword among the keywords, from the beginning of the text, is regarded as a target, and a comparison is made between the characters starting from the rightmost one in the partial text and each of the three keywords, as shown in FIG. 2. Since the rightmost character "m" in the partial text does not match any of the rightmost characters of the three keywords, and this character exists in only the word "smart" in this figure, it is proved that the comparison is resumed after all of the three keywords are shifted to the right by three characters. The document referring to the FAST method is given below:

Noriyoshi URAYA: FAST: A Fast Algorithm for Matching Multiple Patterns, IPSJ (Information Processing Society of Japan), Vol.30 No.9, pp.1119 (1989)

Conventionally, it was general practice to perform a character string search using any of the above described methods. By way of example, a method such as the above described BM method is employed for a apparatus such as a word processor, etc. in which a character string search is performed using only one keyword. In the meantime, a method such as the AC method is employed for a system such as a database system of a large size, in which a search is performed at the same time based on a plurality of keywords.

If search conditions such as the number of keywords are determined to some extent as described above, a relatively high search speed can be implemented by performing a search with a particular search method employed in a character string search apparatus. However, if the number of keywords is indefinite, if the keywords are of various lengths, or in a type of text to be searched, for example, the language that the text is written in is not identified, the optimum search method cannot be selected in correspondence with such search conditions.

SUMMARY OF THE INVENTION

The objects of the present invention are to allow a search method with the highest search speed to be selected from a plurality of search methods in correspondence with a search condition, generally for a pattern search apparatus, and to provide a search apparatus and its method for allowing a search method with the highest search speed to be selected from the above described three methods, specifically for a character string search apparatus.

A pattern search apparatus according to the present invention, which is provided with a search target and a search pattern to be found in the search target, is intended to find the search pattern in the search target. It comprises a search method selecting unit and a search unit.

The search method selecting unit selects one of a plurality of search methods in correspondence with a search condition on which a search is performed using a search pattern.

The search unit searches the search pattern for the search target using the search method selected by the search method selecting unit.

The search target is, for example, a text composed of character strings, and the search pattern is, for example, a keyword composed of a character string. A search condition on which the search method selecting unit selects a search method in this case, is based on a keyword, such as the number of keywords, specification of the length of a shortest keyword among keywords, and a ratio of each code type in the keyword.

Additionally, the search method selecting unit selects any of the Boyer-Moore method, Aho-Corasick method, and FAST method as a search method. It selects the Boyer-Moore method on the condition that the number of keywords is 1 and the length of the keyword is 2 bytes or more. It selects the Aho-Corasick method on the condition that the number of keywords is 1 or more and the length of the shortest keyword among the keywords is 1 byte. It evaluates a determination function to select either of the above described Aho-Corasick and FAST methods depending on the result of the evaluation, on the condition that the number of keywords is two or more and the length of the shortest keyword among the keywords is 2 bytes or more.

The determination function is provided as a ratio of "k", which is the number of keywords included in a search condition, to "K", which is a general experimental value of the number of keywords at a boundary at which the time required for a search according to the FAST method is longer than that according to the Aho-Corasick method in correspondence with the length "L" of the shortest keyword among the keywords. If the value of the determination function is smaller than 1, the search method selecting unit selects the FAST method. Or, if the value of the determination function is equal to or greater than 1, the search method selecting unit selects the Aho-Corasick method.

The determination function may be supported for each text form of a character string to be searched, for example, each description language. Otherwise, each of a plurality of determination functions may be used depending on a keyword, and, for example, a ratio of each code type in the keyword. The code type includes a 1-byte code type and a 2-byte code type. If the ratio of the 1-byte code is larger, a determination function for the 1-byte code is used. On the otherhand, if the ratio of the 2-byte code is larger, a determination function for the 2-byte code is used.

The pattern search apparatus according to the present invention further comprises a storage unit for storing a search target. The above described search unit may be configured so that a search is performed for a search target stored in the storage unit.

The pattern search apparatus may further comprise an output unit for outputting a result of a search performed by the search unit.

The present invention covers also a pattern search apparatus comprising the output unit which uses the result of a search performed by the search unit, replaces a search pattern in a search target with a pattern corresponding to each search pattern, and outputs the replaced pattern.

As described above, a search method considered to be optimum for a search condition can automatically be selected in correspondence with a search condition, thereby performing a search or a replacement, according to the present invention. Particularly, when a character string to be searched (keyword) is searched for in a text, the search method optimum for a form such as a language in which the text to be searched is written, used code, etc., can be automatically selected on the basis of the keyword. It significantly improves the search speed for a character string.

BRIEF DESCRIPTION OF THE DRAWINGS

FIG. 6A shows an example of an execution time of a process implemented with the BM method, while FIG. 6B shows an example of an execution time of a process implemented with the AC method;

FIG. 14 is a table showing a relationship between a length of a shortest character string to be searched and a boundary number of character strings to be searched (Japanese text);

FIG. 18 is a table showing a relationship between a length of a shortest character string to be searched and a boundary number of character strings to be searched (Chinese text);

FIG. 22 is a table showing a relationship between a length of a shortest character string to be searched and a boundary number of character strings to be searched (English text);

FIG. 26 is a table showing a relationship between a length of a shortest character string to be searched and a boundary number of character strings to be searched (program text);

FIG. 31A is a flowchart showing a replacement process, while

FIG. 32A exemplified a keyword search for the Japanese text, while FIG. 32B exemplified a Japanese text; and FIG. 33A exemplifies a keyword search performed for English text, while FIG. 33B exemplified an English text.

DESCRIPTION OF THE PREFERRED EMBODIMENTS

Figure 3:
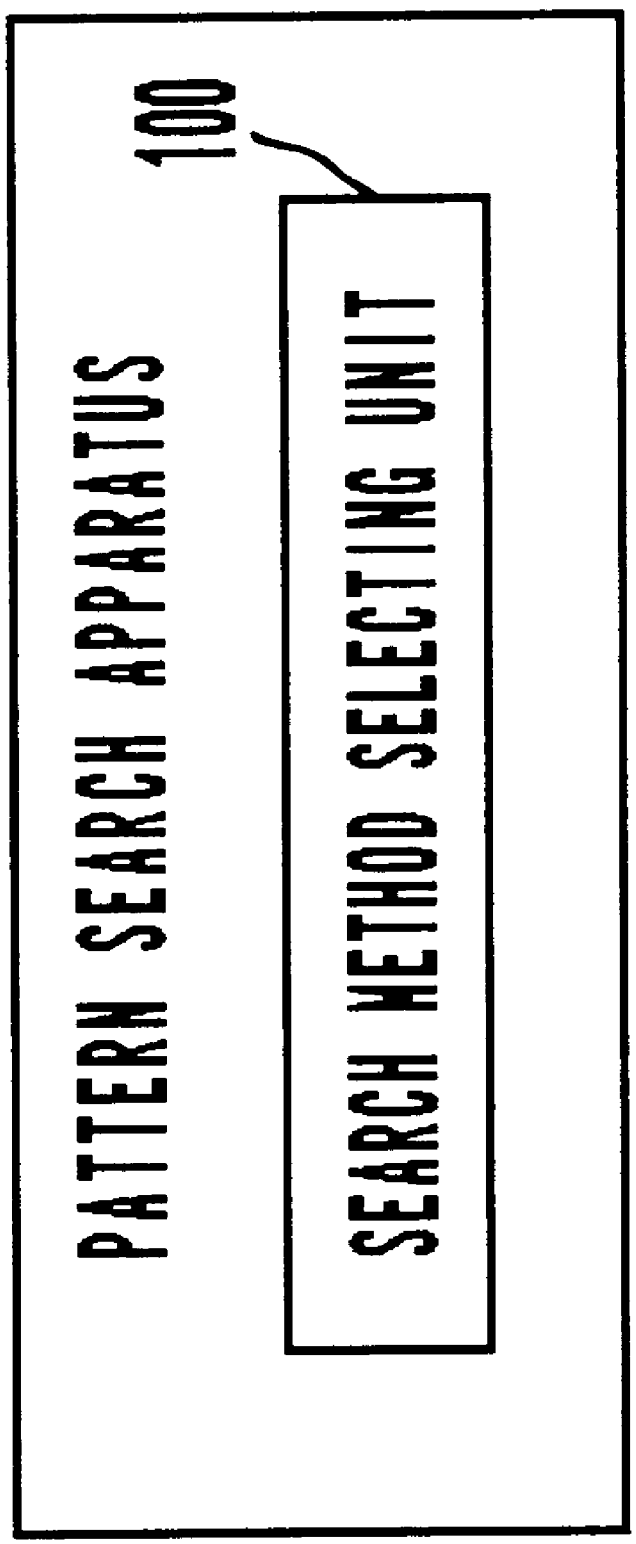
FIG. 3 is a block diagram showing the principle of the present invention.

FIG. 3 is a block diagram showing the principle of a pattern search apparatus according to the present invention. The pattern search apparatus shown in this figure finds a search pattern in a search target on the condition that a search pattern to be searched and a search target are provided.

The present invention generally targets the pattern search apparatus for finding a search pattern in a search target. The explanation provided below, however, refers to a character string search apparatus as an embodiment.

In FIG. 3, a search method selecting unit 100, which corresponds to, for example, a pattern matching method selecting unit in the character string search apparatus, is intended to select one of a plurality of search methods, for example, the above described three methods, in correspondence with a search pattern, that is, a search condition including the number of keywords as character strings.

As described above, a search method to be selected for a character string search is limited depending on whether the number of keywords is either only one or two or more. Additionally, search speed, that is, search time, to be described in detail later, may vary significantly depending on the length of the shortest keyword and the number of keywords, if there are a plurality of keyword lengths and a plurality of keywords.

Therefore, the above described AC method, for example, is employed in this embodiment if the length of the shortest keyword is very short. If the length of the shortest keyword is relatively long, and the number of keywords is only one, the BM method, for example, is selected.

Furthermore, if the length of the shortest keyword is relatively long, and at the same time, the number of keywords is two or more, a value of a determination function dependent on the number of keywords and the length of the shortest keyword, for example, is obtained, and either of the above described AC method and the FAST method is adopted based on that value.

According to this embodiment as described above, a search method considered to optimum is selected in correspondence with a search condition such as the number of keywords, the length of the shortest keyword etc.

Figure 4:
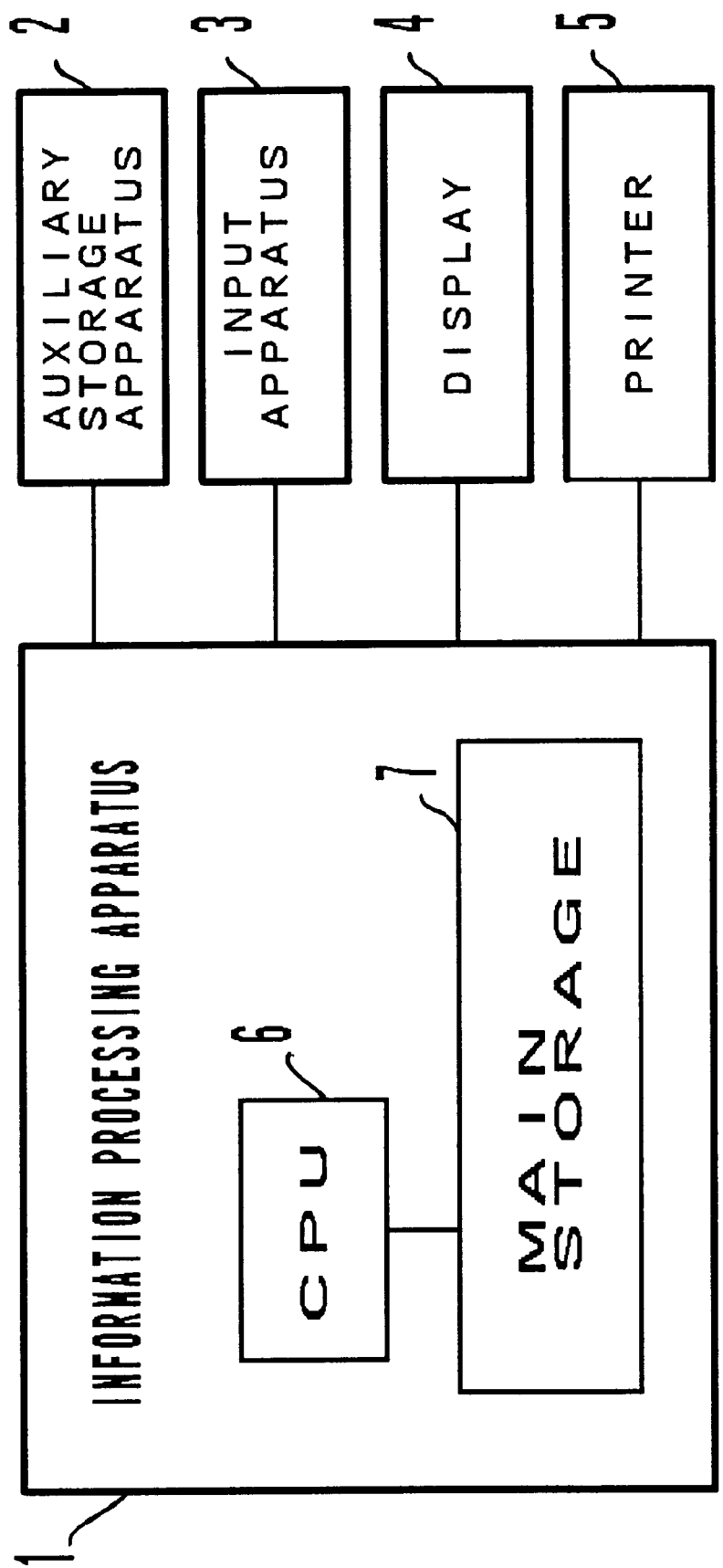
FIG. 4 is a block diagram showing the configuration of an information processing system.

FIG. 4 is a block diagram showing the configuration of an information processing system implemented as this embodiment. The information processing system shown in this figure comprises an information processing apparatus 1, auxiliary storage apparatus 2, input apparatus 3, display 4, and a printer 5.

The information processing apparatus 1 is either a general-purpose computer or a word processor, etc. dedicated to handling character information. It includes a CPU 6, a main storage 7 composed of a ROM, a RAM, etc. in an address space of the CPU 6, and an interface, which is not shown in the drawing, for connecting the information processing apparatus 1 to the external devices.

The auxiliary storage apparatus 2 is a disk device, etc., and provides the information processing apparatus 1 with a text data to be searched, etc.

The input apparatus 3 is a keyboard, etc., and provides the information processing apparatus 1 with an instruction, a keyword which is a character string to be searched, etc.

The display 4 and printer 5 are used to output a search result from the information processing apparatus 1, etc.

Figure 5:
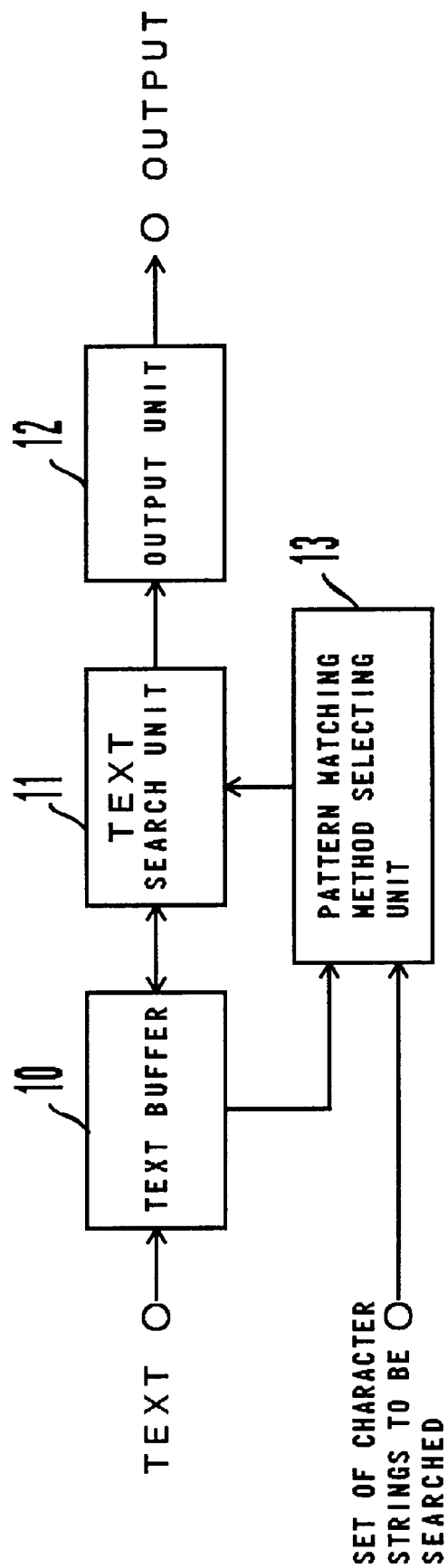
FIG. 5 is a block diagram showing the basic configuration of a character string search apparatus.

FIG. 5 is a block diagram showing the basic configuration of a character string search apparatus. In this figure, the character string search apparatus comprises a text buffer 10 for storing text to be searched; a text search unit 11 for searching a keyword in text stored in the text buffer unit 10; an output unit 12 for outputting a result of the search performed by the text search unit 11; and a pattern matching method selecting unit 13 of the above described BM, AC, and FAST methods according to a character string to be searched, that is a keyword type and the number of keywords, and instructing the text search unit 11 of a selection result.

The text buffer 10 is secured as an area storing text data to be searched in the main storage 7. In a process for reading the text data to be searched, the text data provided by the auxiliary storage apparatus 2 or entered from a command line, etc. via the keyboard of the input apparatus 3, is read into the text buffer 10 arranged in the main storage 7.

The pattern matching method selecting unit 13 is implemented as dedicated hardware in the information processing apparatus 1, or as software in the main storage 7, and includes determination functions for 1-byte and 2-byte codes, a process for selecting the optimum pattern matching method, and a process for selecting a determination function.

The pattern matching method selecting unit 13 secures a working area in the main storage 7 to analyze a set of character strings to be searched (keywords), (that is, to select a determination function and calculate information required for pattern matching), provided by the auxiliary storage apparatus 2 or the input apparatus 3, and selects the optimum pattern matching method according to the result of the analysis. The result of the analysis is stored in the main storage 7, and referenced by the text search unit 11.

The text search unit 11 is implemented as dedicated hardware in the information processing apparatus 1, or as software in the main storage 7, and includes search engines implemented with the respective BM, AC, and FAST methods, and a process for storing a search result.

The text search unit 11 uses any of the search engines selected by the pattern matching method selecting unit 13 to scan the text buffer 10 storing prepared text data and to search a character string. The search result is stored in the main storage 7 in the format {character string to be searched: location at which the character string to be searched is found, location at which the character string to be searched is found, . . . }.

The output unit 12 secures a working area in the main storage 7, and performs an output process by referencing the search result obtained by the text search unit 11 and text data in the text buffer 10 in the main storage 7. As output data, a location (or a line) at which a character string to be searched exists in text data is normally output. The output result is written to the auxiliary storage apparatus 2, and output from the display 4 or the printer 5.

In FIG. 5, the pattern matching method selecting unit 13 selects any of the above described three methods depending on a search condition such as the number of keywords, the length of the shortest keyword, etc., and instructs the text search unit 11 of the selected method. The text search unit 11 includes the three engines (three pieces of software) for implementing the above described three search methods. Any of the engines corresponding to a specified character string search method is used to search for a keyword in a text. The output unit 12 outputs the search result to a user in a form according to a user request, for example, in the form where the keyword is replaced with another character string.

Provided below is the further explanation about the features of a character string search implemented by the above described three methods.

The first method, that is the BM method, is an efficient search method, but it allows only one keyword to be searched at one time.

The second method, that is the AC method, allows a plurality of keywords to be searched simultaneously, but it takes rather a long time to perform a search. This is because text is checked by characters to trace a state transition.

Figures 1A, 1B, 1C:
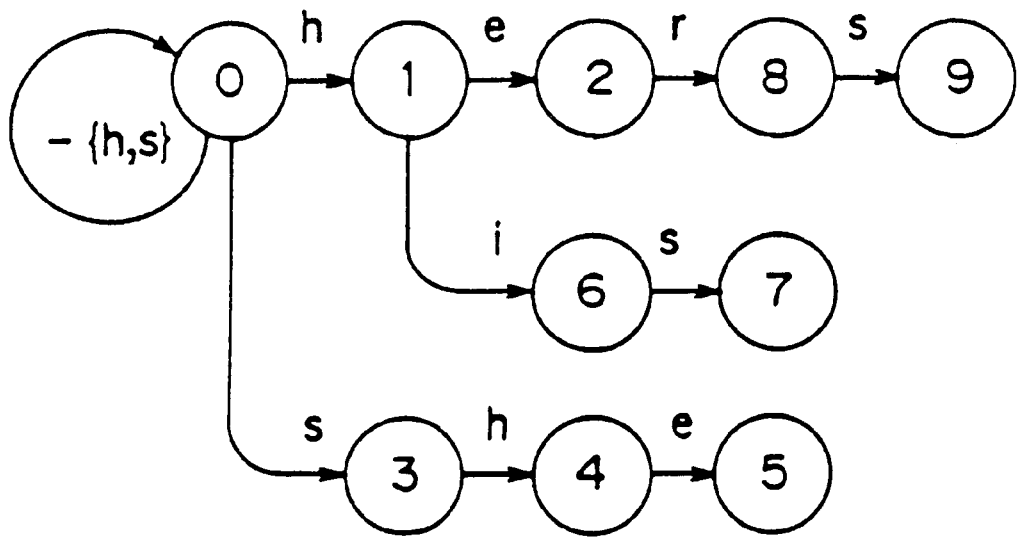
FIGS. 1(A–C) is a schematic diagram explaining a keyword search according to the AC method.
Figure 2:
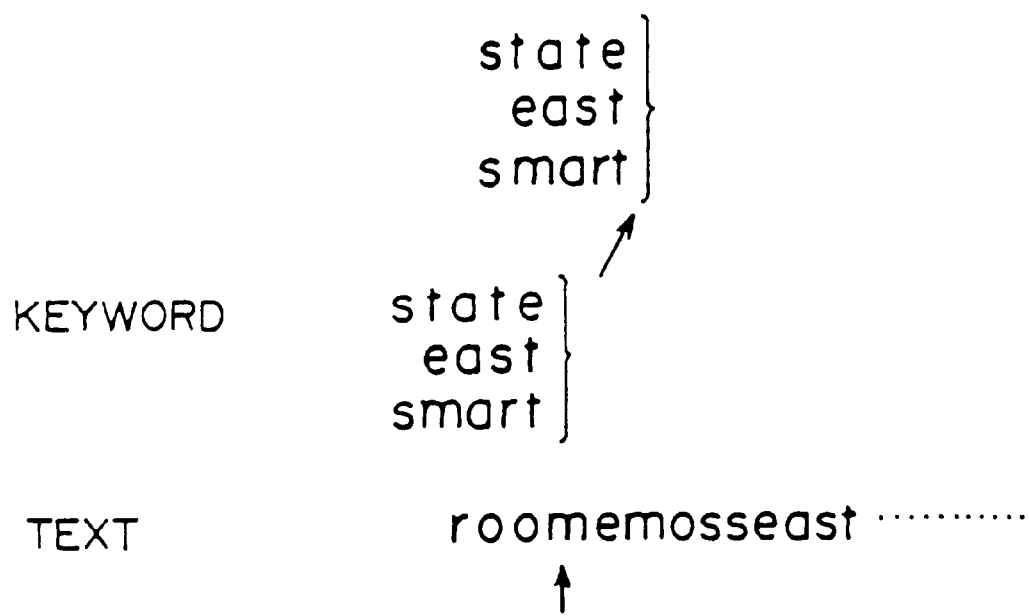
FIG. 2 is a schematic diagram explaining matching of a plurality of keywords according to the FAST method.

The third method, that is, the FAST method implemented by combining the advantages of the BM and AC methods, offers high search speed if the number of keywords is relatively small. However, if a large number of keywords are searched simultaneously, it takes a long time to make a checking when the rightmost character of a keyword matches a corresponding character in text and returns to the left, as explained by referring to FIG. 2. Therefore, it requires a longer time than that of the AC method.

Assuming that the number of keywords is "k", an average length of keywords is "l", and a length of a text is "n", an amount of search time for one keyword will be of the order of $O(n/l)$, and of the order of $O(nl)$ in the worst case, according to the first BM method. For "k" keywords, the amount of search time will be of the order of $O(kn/l)$ normally. With the second AC method, the amount of search time does not depend on the number of keywords and the length of a keyword, and becomes almost constant of the order of $O(n)$. Assuming that the length of the shortest keyword among keywords is "L", a best value of search time will be of the order of $O(n/L)$, according to the FAST method. If the number of keywords is small, a good value will be expected. However, if the number of keywords becomes large, the amount of search time will be longer than the order of $O(n)$ of the AC method. The number of keywords that makes the amount of search time longer than that of the AC method, is virtually determined by the length of the shortest keyword, to be described later.

However, not only an amount of time spent for a search process which varies depending on an algorithmic factor such as pattern matching, etc., but an amount of time spent for reading a text prior to the search process and performing a preprocess is significant for an execution speed of a character string search in an actual character string search apparatus.

FIG. 6A shows a ratio of execution times of each process according to the BM method. In this figure, "_read" indicates an amount of time for reading a text to be searched, and "_bm_engine" indicates an amount of time for matching a pattern. Note that this ratio slightly varies depending on the length of a character string to be searched and the size of a text to be searched, and it is not a strict ratio.

It is seen from FIG. 6A that the process for reading text is 62.5% of the entire process.

FIG. 6B shows a ratio of execution times of each process according to the AC method. In this figure, "_read" indicates an amount of time for reading a text to be searched, and "_ac_engine" indicates an amount of time for matching a pattern.

It is seen from FIG. 6B that there is almost no difference between the amounts of time for reading text according to the AC and BM methods. However, the amount of time spent for the entire process of the AC method is longer than that of the BM method, and the percentage of the process for reading text is 13.8% of the entire process. This ratio is almost constant regardless of the number of character strings to be searched. With the FAST method, the ratio of the amount of time for reading text during execution time varies depending on the number of character strings to be searched. If the number of character strings to be searched is 2, the ratio will be similar to that of the BM method. If the number of character strings to be searched is close to a boundary number of character strings to be searched, to be described later, it will be a ratio close to that of the AC method.

The amount of time spent for reading text or performing a preprocess significantly affects an actual execution time as described above. Therefore, not only the amount of time spent for the process of matching a pattern, but the amount of time spent performing these processes is considered hereinafter. (Note that the Sunday method is added to the above described three methods for the specification, as a corresponding application of the present invention filed in Japan, and selection is made from these four methods. As a result of a re-review in consideration of the amount of time spent for reading text or performing a preprocess, however, no superiority is found in a search implemented with the Sunday method. Therefore, the specification has been changed so that the selection is made from the three methods such as the BM, AC, and FAST methods according to the present invention.)

Figure 7:
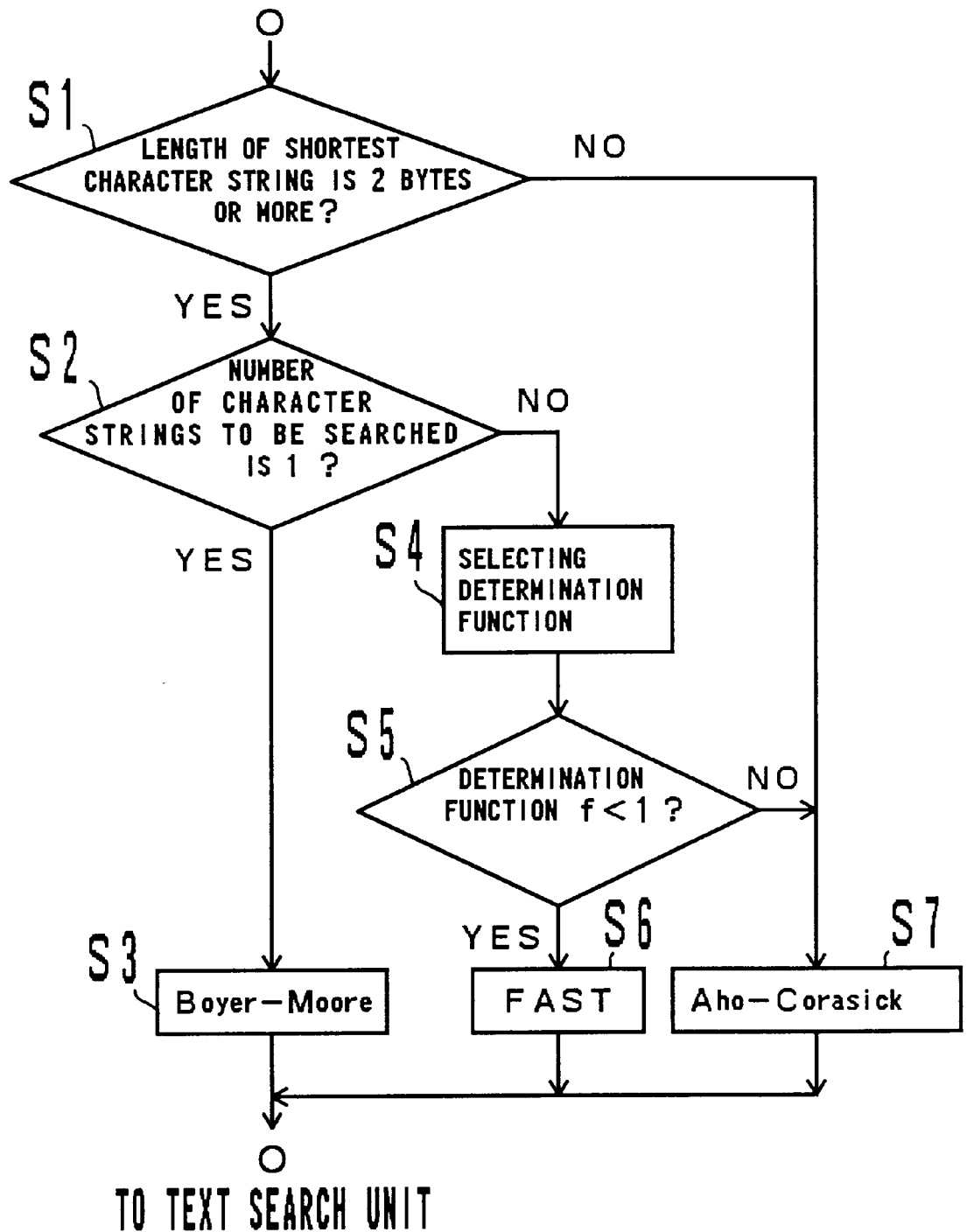
FIG. 7 is a flowchart showing a process for selecting a character string search method.

FIG. 7 is a flowchart showing a process for selecting a character string search method in this embodiment. The process shown in this figure is performed by the pattern matching method selecting unit 13 shown in FIG. 5.

When a set of character strings to be searched, that is, a set of keywords is given in FIG. 7, it is determined whether or not the length of the shortest character string (keyword) is 2 bytes or more in step S1. If the length of the shortest keyword is not 2 bytes or more, that is, 1 byte, the AC method is immediately selected without making a determination of the number of keywords, and the selected method is instructed to the text search unit 11, in step S7.

The reason why the AC method is unconditionally selected when the keyword is 1 byte is that the comparison made at the rightmost character of a keyword implemented with the FAST method is actually a character-by-character comparison, and an advantage of the FAST method (the reduction of the number of matching times) cannot be obtained.

If the length of the shortest keyword is 2 bytes or more in step S1, it is determined whether or not the number of character strings to be searched, that is, the number of keywords, is only one in step S2. If YES, the BM method is selected, and the selected method is instructed to the text search unit 11, in step S3.

If the number of character strings to be searched, that is, the number of keywords, is not determined to be 1, either of a determination function for 1-byte code and a determination function for 2-byte code is selected in step S4, to be described in detail later by referring to FIG. 28. In step S5, the value of the determination function "f" selected in step S4 is obtained, and it is determined whether or not that value is smaller than "1". The determination function "f" will be described later.

If the value of the determination function "f" is smaller than 1, the FAST method is selected in step S6. If it is not smaller than 1, the AC method is selected in step S7. Each of the selected methods is instructed to the text search unit 11.

Provided below is the detailed explanation about the grounds for the process for selecting a character string search method and the result of an experiment conducted on the above described determination function "f".

FIGS. 8 through 11 show respective graphs where a vertical axis indicates an amount of search time and a horizontal axis indicates the number of character strings to be searched (the number of keywords) in the case where a character string is searched using the respective BM, AC, and FAST methods for Japanese and Chinese text written in 2-byte code, and English and program text written in 1-byte code.

Figure 8:
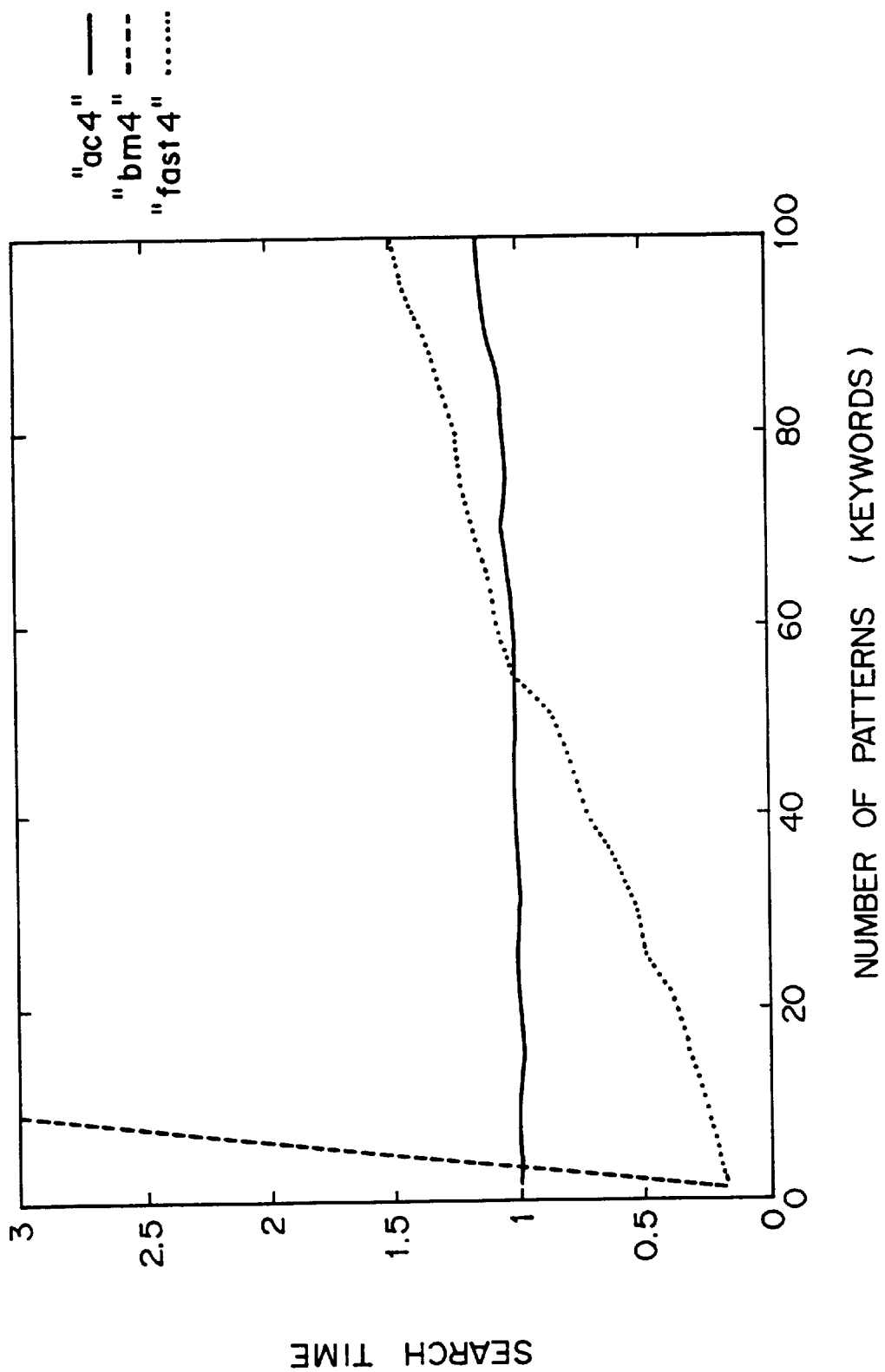
FIG. 8 is a graph showing a comparison between search times according to the respective search methods (made for Japanese text)

FIG. 8 shows the result of the search experiment conducted on the Japanese text using the respective search methods. This experiment is conducted in such a way that a character string is searched for in a Japanese text of 75 M bytes, using a set of character strings to be searched in which the length of the shortest character string to be searched is 4 bytes (the number of bytes of the shortest keyword among the keywords used for the search), according to the respective search methods. In this figure, the search time indicated by the vertical axis is normalized by assuming that the search time implemented with the AC method is 1.0 in the case where the length of the shortest character string to be searched among the used key words is 4, and the number of keywords is only 1. The horizontal axis indicates the number of character strings to be searched (the number of keywords). "bm", "ac", and "fast" shown in this figure represent the results of a search implemented with the respective BM, AC, and FAST methods, and the numerals following the "bm", "ac", and "fast" represent the length of the shortest character string to be searched.

Figure 9:
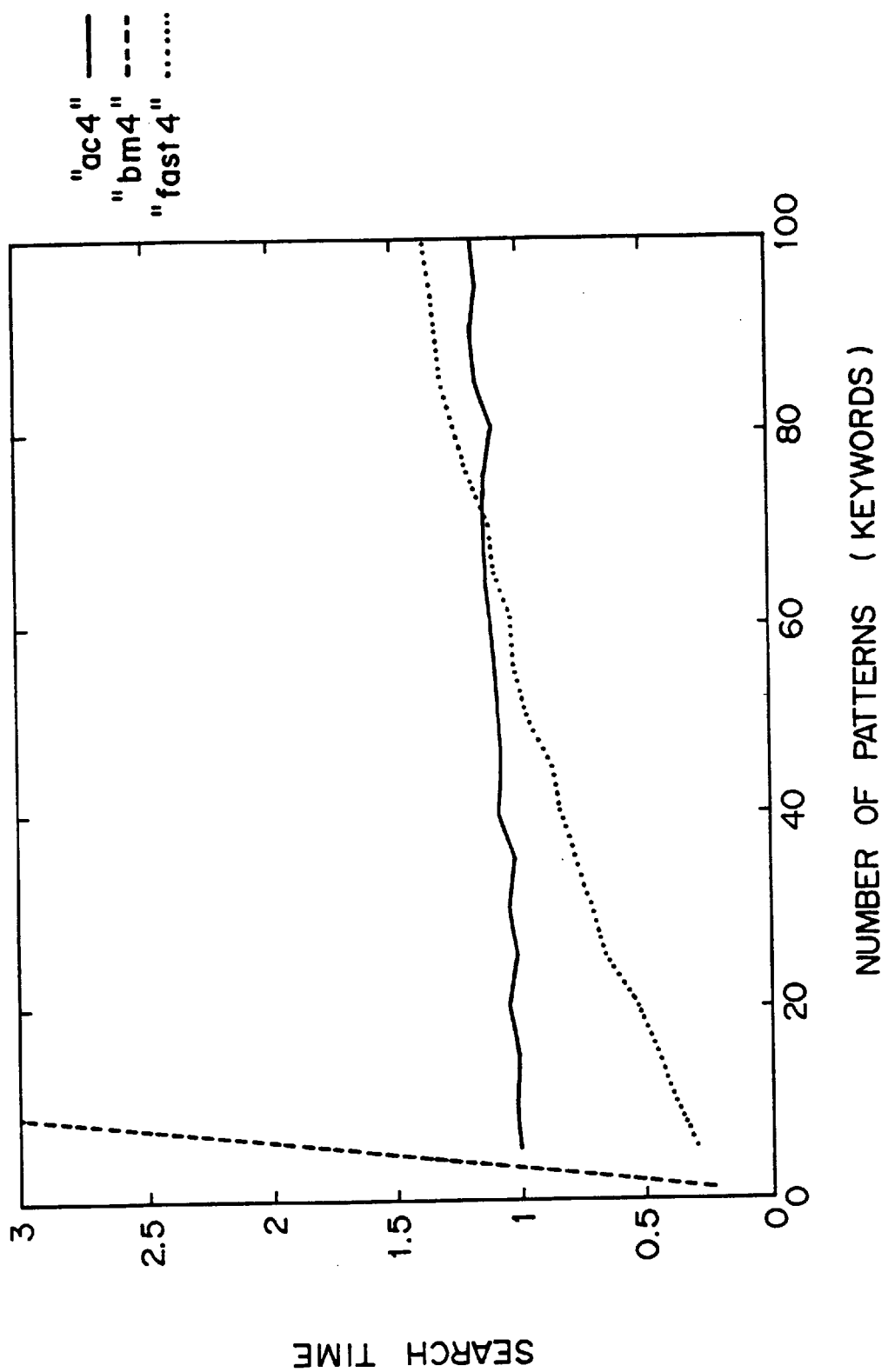
FIG. 9 is a graph showing a comparison between search times according to the respective search methods (made for Chinese text)

FIG. 9 shows the result of an experiment conducted on the Chinese text, which is similar to that of FIG. 8. This figure shows the result of a character string search performed for a Chinese text data of 76 M bytes, according to the respective search methods. In a similar manner as in FIG. 8, the vertical axis indicates the value of the search time which is normalized by assuming that the search time for a search implemented with the AC method is 1.0 in the case where a keyword of 4 bytes is used. The horizontal axis indicates the number of character strings to be searched (the number of keywords).

Figure 10:
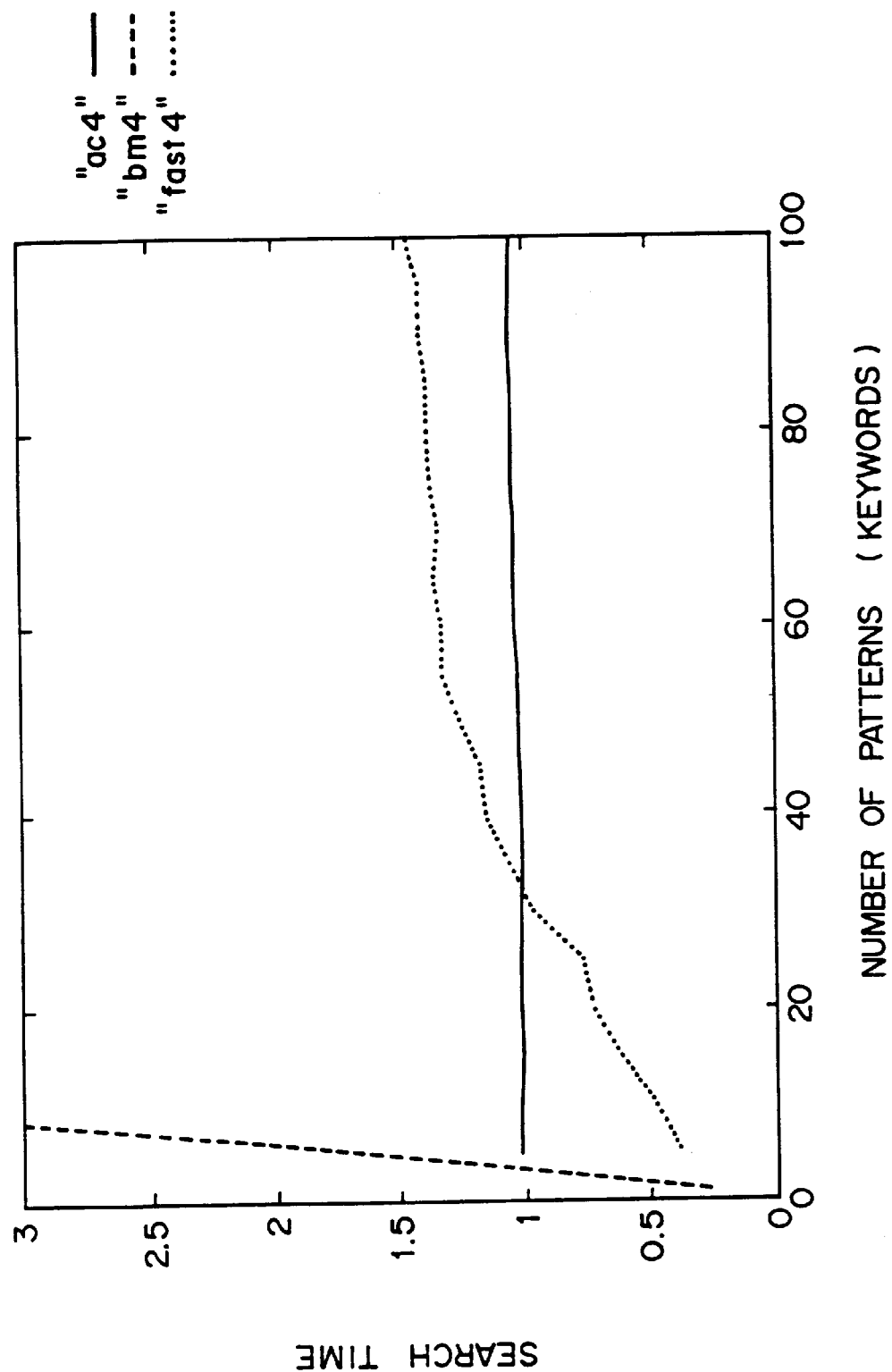
FIG. 10 is a graph showing a comparison between search times according to the respective search methods (made for English text)

FIG. 10 shows the result of an experiment conducted on the English text, which is similar to those in FIGS. 8 and 9. FIG. 10 shows the result of a character string search performed for an English text data of 80 M bytes. In a similar manner as in FIGS. 8 and 9, the vertical axis indicates a search time value which is normalized by assuming that the search time implemented with the AC method is 1.0 in the case where one keyword of 4 bytes is used. The horizontal axis indicates the number of character strings to be searched (the number of keywords).

Figure 11:
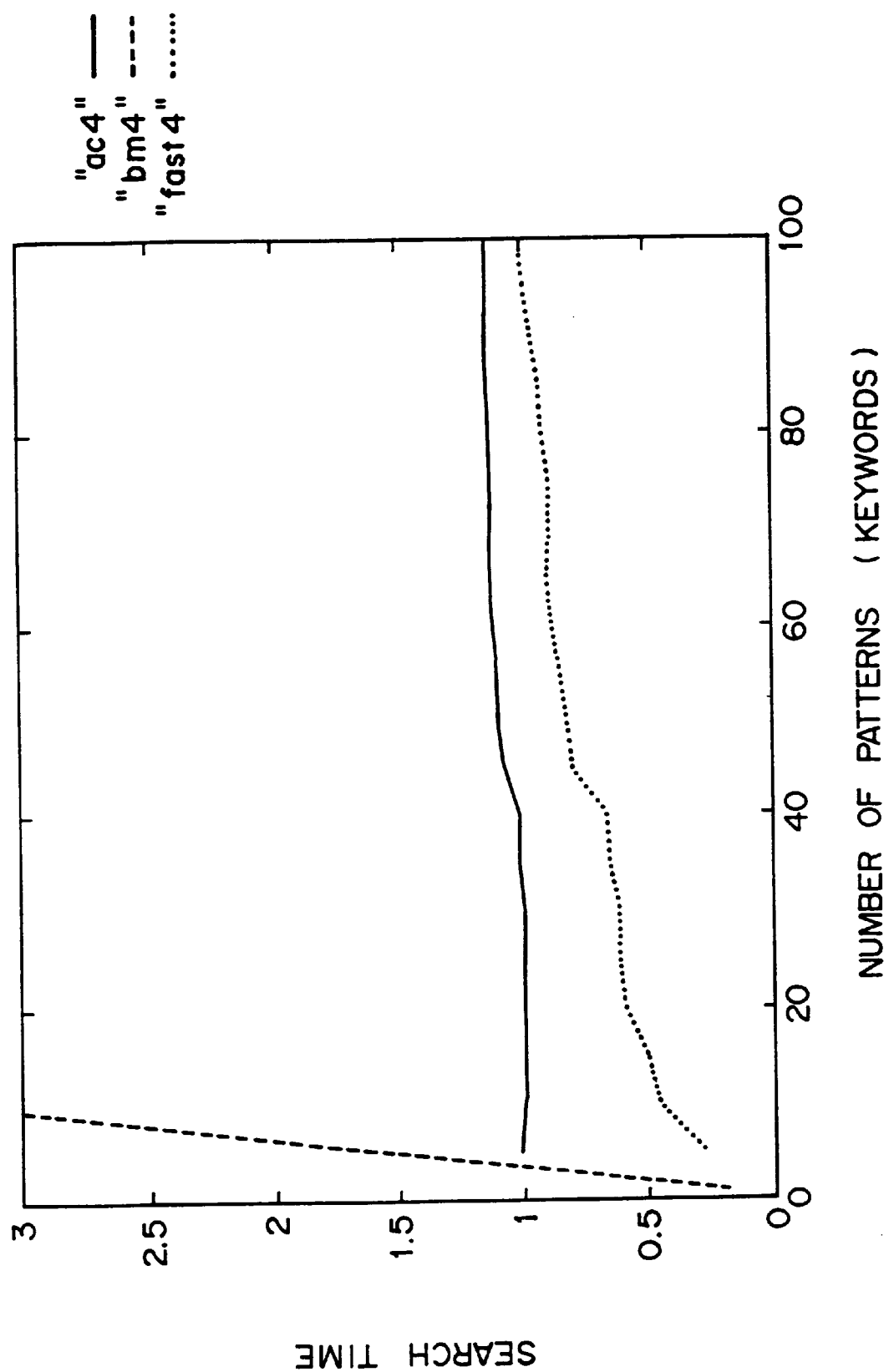
FIG. 11 is a graph showing a comparison between search times according to the respective search methods (made for program text)

FIG. 11 shows the result of an experiment conducted on program text, which is similar to those in FIGS. 8, 9, and 10. FIG. 11 shows the result of a character string search performed for a program text data of 78 M bytes using the respective search methods. In a similar manner as in FIGS. 8 through 10, the vertical axis indicates a search time value which is normalized by assuming that the search is implemented with the AC method is 1.0 in the case where one keyword of 4 bytes is used. The horizontal axis indicates the number of character strings to be searched (the number of keywords).

Normally, each character except for a control code such as a return code, etc. is represented by a 2-byte code (or an amount of information of 2 bytes or more) for a language in which there are a variety of character types to be used normally, such as Japanese, Chinese, etc. In the meantime, each character is represented by 1-byte code in terms of efficiency, for a language in which almost all characters can be represented by 1-byte code (up to 256 characters including control code), such as English, etc.

As seen from the results of the experiments shown in FIGS. 8 through 11, some scatter exists in each form of each text data (each language). However, the search time does not increase even if the number of keywords grows, according to the AC method. The search time using the BM method is shorter than that using the AC method, if the number of keywords is several or less. The search time using the BM method, however, is longer than that using the AC method, if the number of keywords is several or many, the search times become longer. Similarly, the search time using the FAST method is shorter than that using the AC method, if the number of keywords is not more than 40. The search time using the FAST method is longer than that using the AC method, if the number of keywords is 40 or more.

Figure 12:
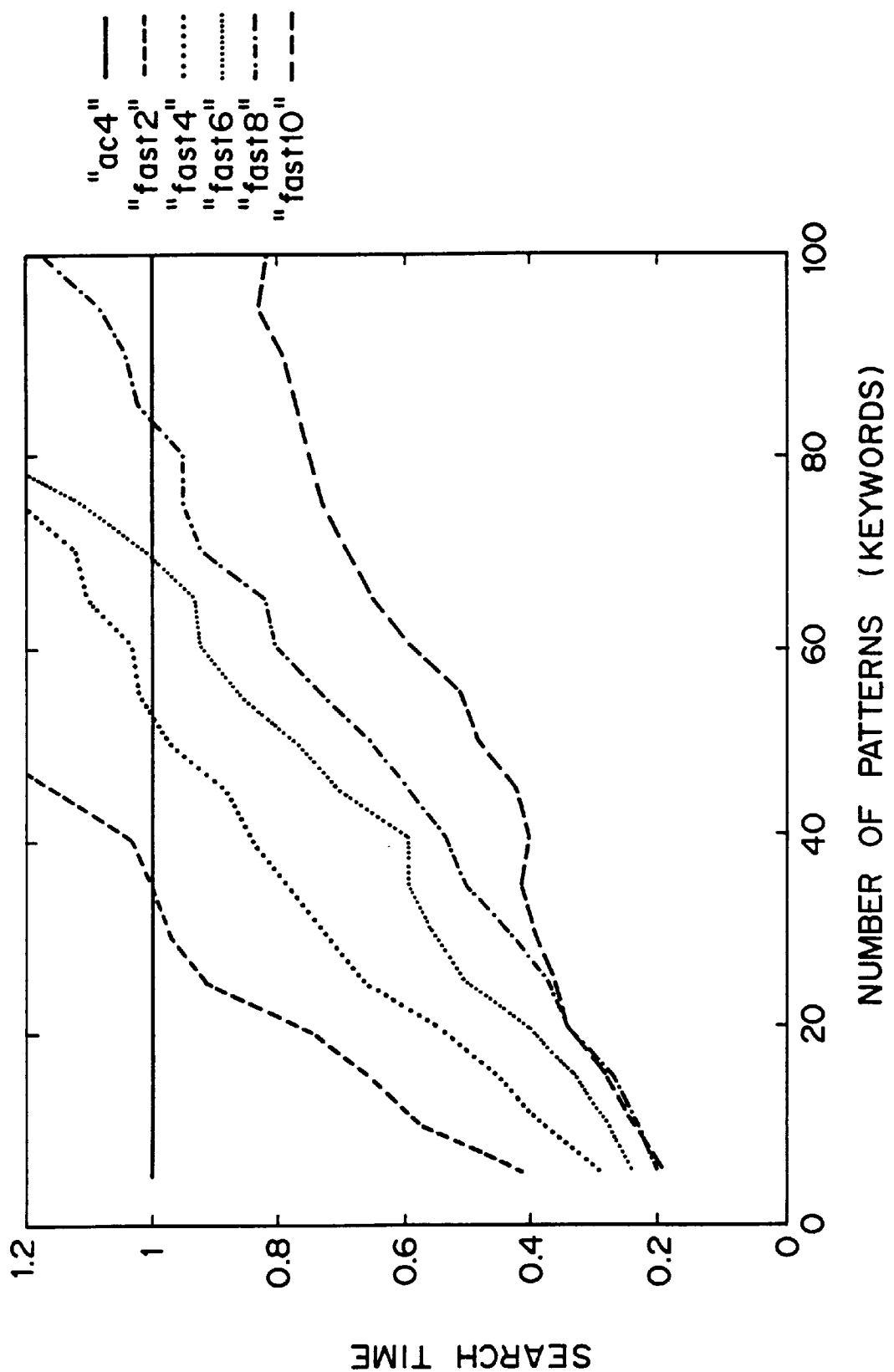
FIG. 12 is a graph showing a relationship between search times and the number of keywords according to the FAST method (Japanese text)

FIG. 12 shows the search time as a result of the search performed for the Japanese text using the FAST method in the case where the lengths of the shortest character string to be searched among the keywords are 2, 4, 6, 8, and 10 bytes. The vertical axis indicates the search time, by assuming that the search time is 1 in the case in which the search according to the AC method is performed using a short keyword of 4 bytes. And the horizontal axis indicates the number of character strings to be searched (the number of keywords). As the number of keywords increases, the search time becomes longer, according to the search implemented with the FAST method as shown in this figure.

Here, the number of keywords which makes the search time implemented with the FAST method longer than that implemented with the AC method, is defined as a boundary number of character strings to be searched. As seen from FIG. 12, the boundary number of character strings to be searched becomes smaller as the length of the shortest keyword (the length of the shortest character string to be searched) becomes smaller.

Figure 13:
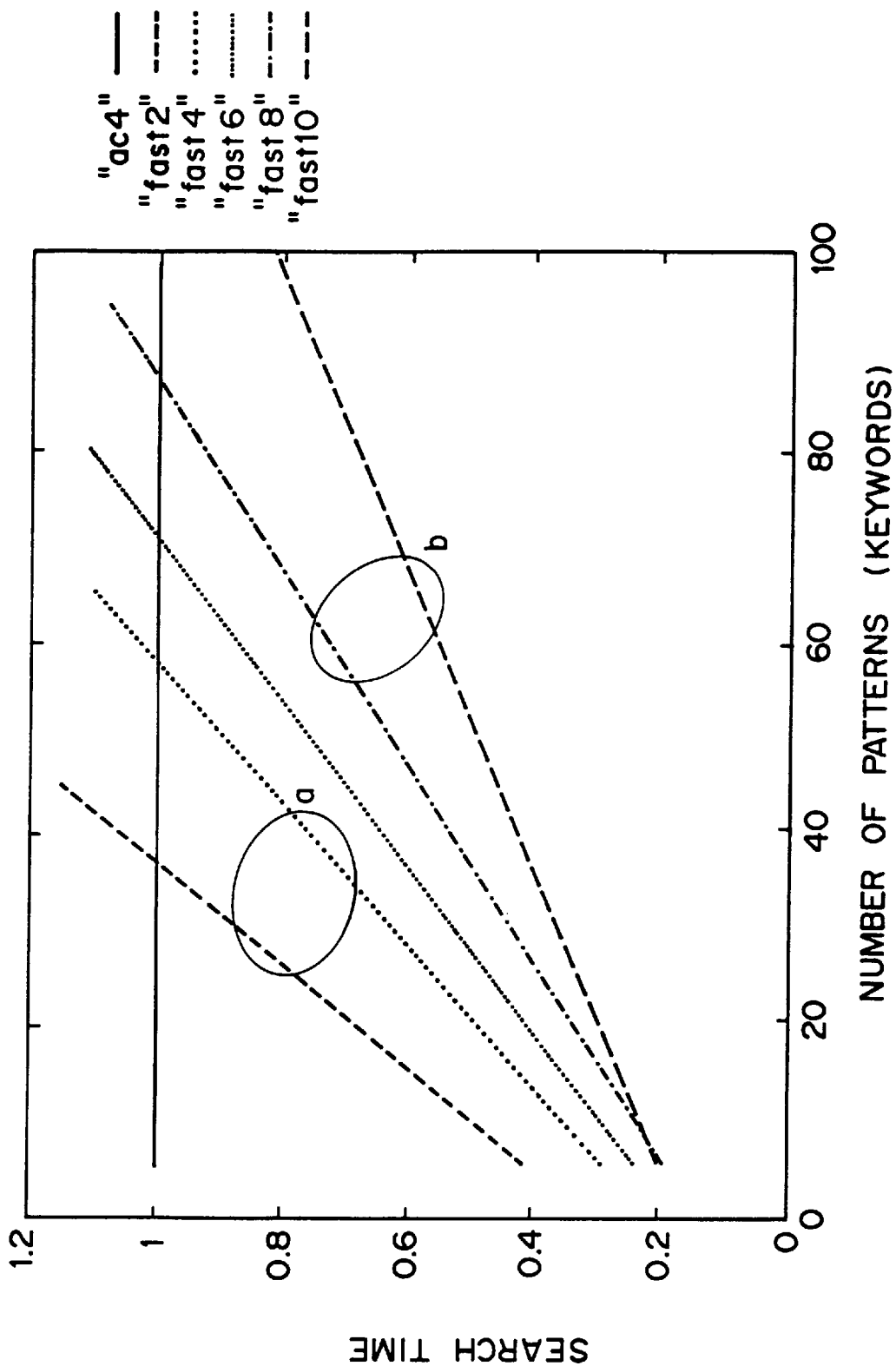
FIG. 13 is a graph showing a result of linearization of FIG. 12.

FIG. 13 shows the result of linearizing the relationship between the search time of the length of the shortest character string to be searched and the number of keywords, by applying a least square method to the results of FIG. 12.

FIG. 14 is a table showing numbers of character strings at a point at which the straight line obtained by each length of the shortest character string to be searched intersects the straight line indicating the search time, in the case in which the search according to the AC method is performed using the shortest keyword of 4 bytes, that is, showing boundary numbers of character strings to be searched as the number of character strings to be searched (the number of keywords), in the case in which the search time is 1. The boundary number of character strings to be searched corresponding to the length of the shortest character string to be searched, which is not shown in FIG. 13, is obtained by applying the Lagrange interpolation to the results of FIG. 13.

Figure 15:
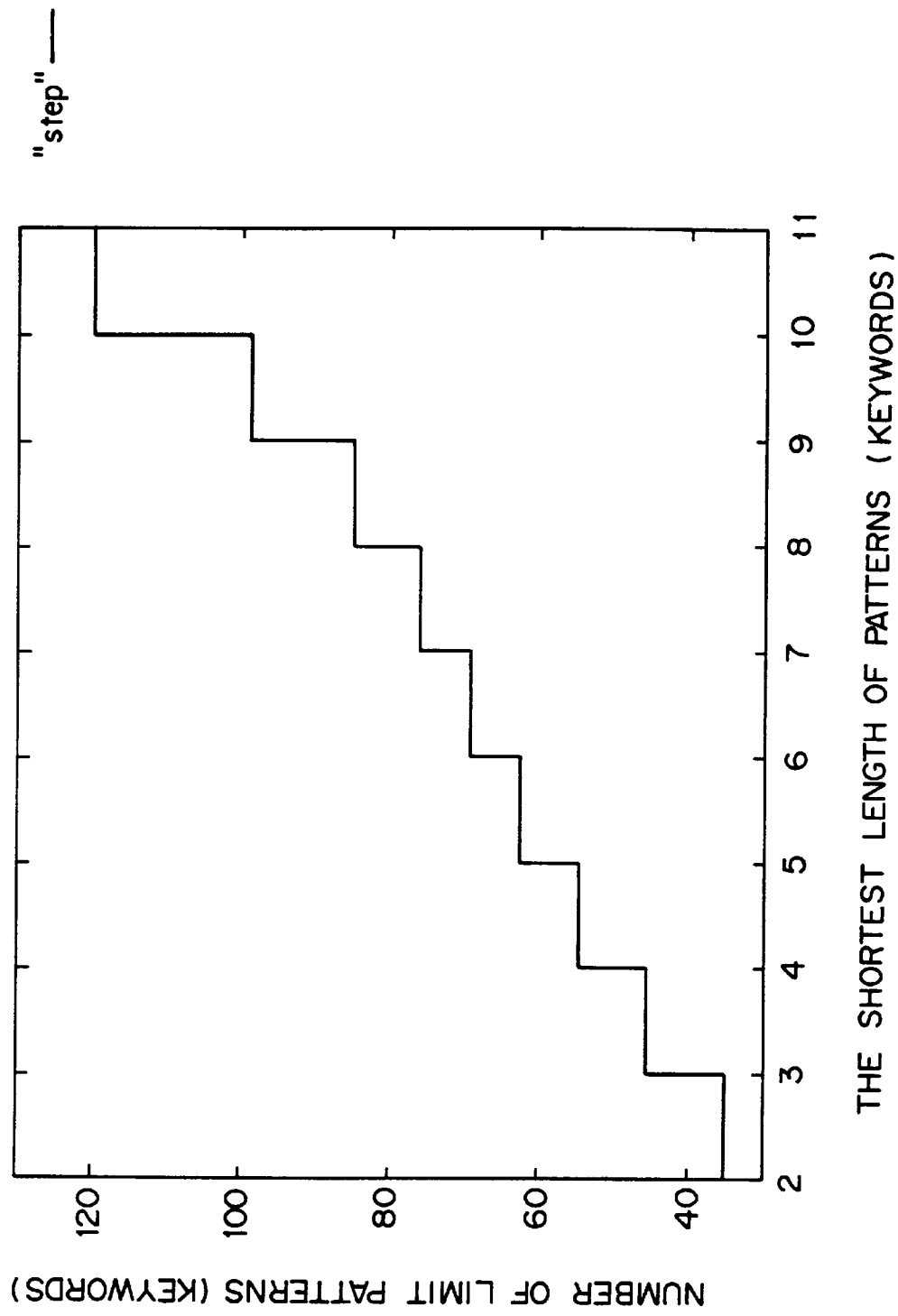
FIG. 15 is a graph showing a step function as a boundary number of character strings to be searched (Japanese text)

FIG. 15 shows the results of FIG. 14 as a step function. A horizontal line indicates the length of the shortest character string to be searched, while a vertical line indicates the number of character strings to be searched, that is, the number of keywords. In FIG. 15, the portion below the step function indicates the range in which the search time using the FAST method is shorter than that using the AC method.

As described above, the search time using the AC method increases slightly as the number of keywords grows. That is, the search time using the AC method can be regarded as being almost constant. Especially, the length of the shortest character string to be searched does not affect the search time at all. According to the FAST method, both the number of keywords and the length of the shortest keyword affect the search time, but the average of keyword lengths virtually does not affect the search time. Therefore, if the number of keywords included in a text is close to the average, the form of the step function shown in FIG. 15 does not vary much depending on the specific contents of a text and differences of keywords, for example, in a text written in the same form (language). Accordingly, this step function is considered to be normally used as being valid.

Provided next is the explanation about the above described determination function "f". Assume that the length of the shortest character string to be searched is "L", and the boundary number of character strings to be searched is "K". In addition, a function representing the relationship shown in FIG. 14 or FIG. 15 is defined as K=g(L). This function will become a step function. Assuming that the number of keywords to be searched in a text is "k", the determination function "f" is defined as the following equation.

$$f(k, L)=k/g(L)=k/K$$

To make the search time using the FAST method shorter than that using the AC method when the number of keywords "k" is smaller than the step function shown in FIG. 15, that is, the boundary number of character strings to be searched "K", the FAST method is selected in step S5 of FIG. 7 on the condition that the value of the determination function "f" is smaller than 1. Or, the AC method is selected on the condition that the value of that function is not smaller than 1. This determination function is obtained, for example, by the following process.

1) Preparing a text to be searched having a text form (such as a language, program type, etc.) corresponding to a determination function to be obtained.

2) Creating a set of character strings to be searched in which the length of the shortest character string to be searched is {2, 4, 6, 8, 10} bytes.

3) Conducting a search experiment using the set of character strings to be searched prepared in 2) for the text to be searched prepared in 1). The search experiment measures amounts of processing time according to the respective AC and FAST methods if character strings to be searched whose number is between 5 and 100 are simultaneously provided.

4) Approximating the result of the above described experiment using the least square method as shown in FIG. 13, and calculates a number of character string to be searched which makes the amounts of processing time according to the AC and FAST methods identical. The value calculated here is defined as the boundary number of character strings to be searched.

5) Obtaining the boundary number of character strings to be searched when the length of the shortest character string to be searched is {3, 5, 7, 9} bytes, by applying the Lagrange interpolation to the above calculated boundary number of character strings to be searched.

6) Defining the function K=g(L) representing the relationship between the above calculated length of the shortest character string to be searched and boundary number of character strings to be searched, based on the assumption that the length of the shortest character string to be searched is "L", and the boundary number of character strings to be searched is "K" at this time. This function will be a step function.

7) Defining a function which will be f (k, L)=k/g (L), based on the assumption that an actual number of character strings to be searched is "k". The function "f" defined here will be a determination function.

The determination function is prepared beforehand according to the above described steps, and applied to the process for selecting a character string search method (step S4 of FIG. 7).

Provided below is an example of obtaining a determination function in text written in each language according to the above described steps.

Fist of all, an embodiment of obtaining a determination function for Japanese text using the above described process with be explained. The result of the experiments shown in FIGS. 12 through 15 are obtained by the following process.

1) Preparing a Japanese text to be searched (7.5 M bytes×10: Total 75 M bytes).
[Example]

「例」"...比例流量制御バルブの機械的なばらつきや油温の変化を考慮し適正な駆動オンタイムの幅が行われるようにする。一定の速度測定区間を設け、予め規定したオンタイムで規定時間だけ比例流量制御バルブを駆動して速度を測定する。そして、規定した速度との差に応じて駆動オンタイムを補正するか、制御中制御中のセットオンタイムが規定値以上の時のみ前記駆動オンタイ正を行うように制御する。..."

2) Preparing a set of character strings to be searched by extracting them from the text to be searched in 1) at random.
[Example]

{装置, ジェットプリンタ, 比例流動制御バルブ, リフトアーム,...}

3) Conducting a search experiment using 1) and 2). (FIG. 12).

4) Approximating the result of 3) using the least square method (FIG. 13).

5) Estimating the boundary number of character strings to be searched using the Lagrange interpolation (FIG. 14).

6) Defining a step function g(L) based on the result of 5) (FIG. 15).

7) Defining a determination function as f (k, L)=k/g (L) according to g (L) in 6), assuming that an actual number of character strings to be searched is "k".

Let it be supposed that the determination function "f" is obtained in advance according to the above described process. In this case, character strings to be searched, for example, {装置, 文字列検索, 発明者,..., アルゴリズム} are provided (the number of character strings to be searched: 60, the length of the shortest character string to be searched: 4 bytes) for a certain Japanese text, the value of the determination function will be f (k, L)=k/g (L)=60/54.67>1, according to the length of the shortest character string to be searched L=4 bytes, and the number of character strings to be searched k=60. Therefore, the AC method is selected as the pattern matching method in this case.

Provided next is the explanation about an embodiment of obtaining a determination function for Chinese text. FIGS. 16 through 19, which correspond to FIGS. 12 through 15 with the Japanese text targeted, are intended to perform the following process for the chinese text, and obtain the determination function.

1) Preparing a Chinese text to be searched (7.6 M bytes× 10: Total 76 M bytes).
[Example]

"...原子核分裂。老師讀書。麿壓燒丕垢括阻 屈噴定。厘絡貧縋位賞叫 奨概娟電窟。欺噴屈泣葎哨厘奚匯眠壓糞刮片。他在学校工作了二十年。..."

2) Preparing a set of character strings to be searched by extracting them from the text in 1) to be searched at random.
[Example]

{比如, 動脉, 尽管, 春天, 很,...}

Figure 16:
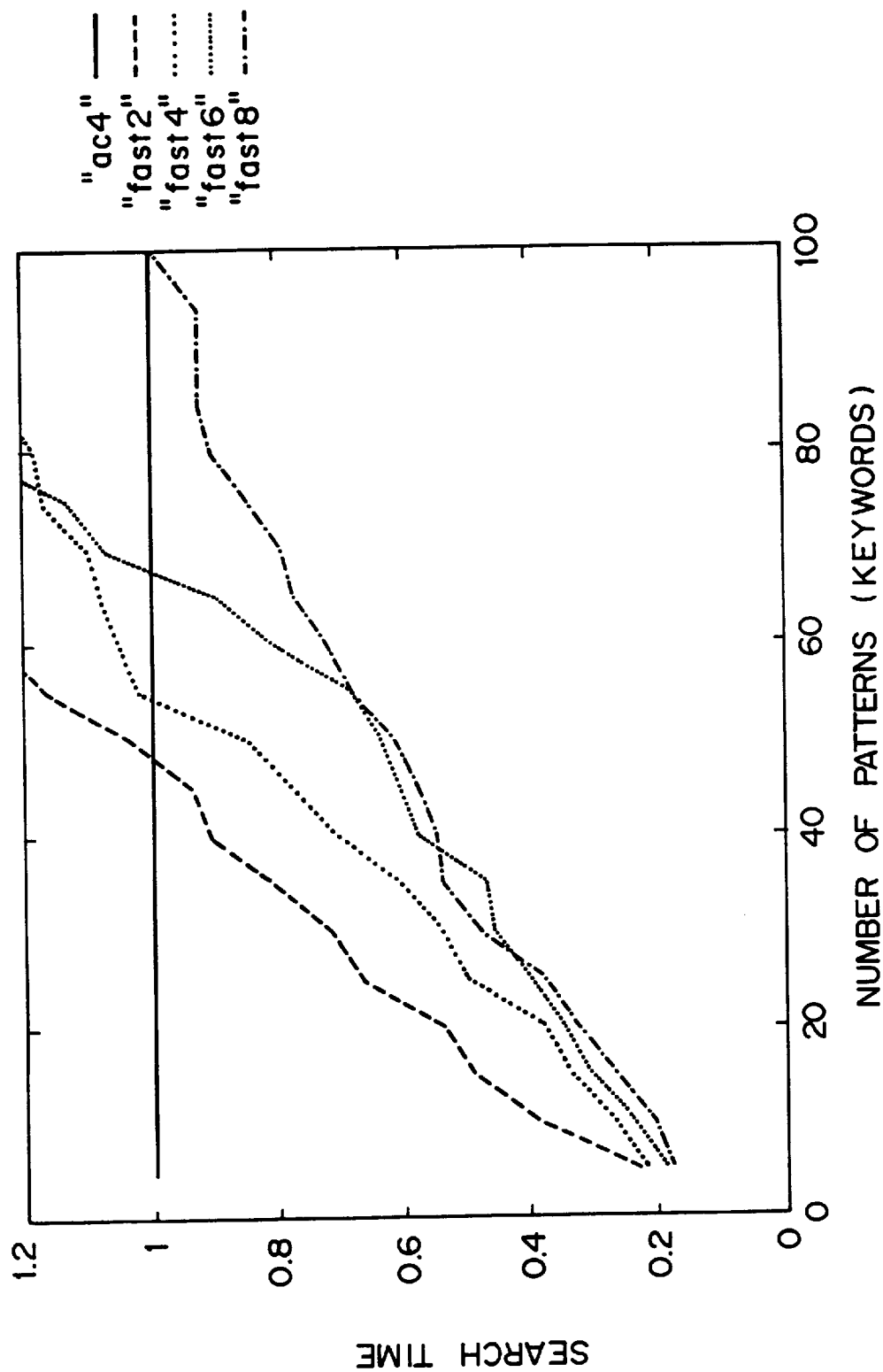
FIG. 16 is a graph showing a relationship between search times and the number of keywords according to the FAST method (Chinese text)

3) Conducting a search experiment using 1) and 2) (FIG. 16).

Figure 17:
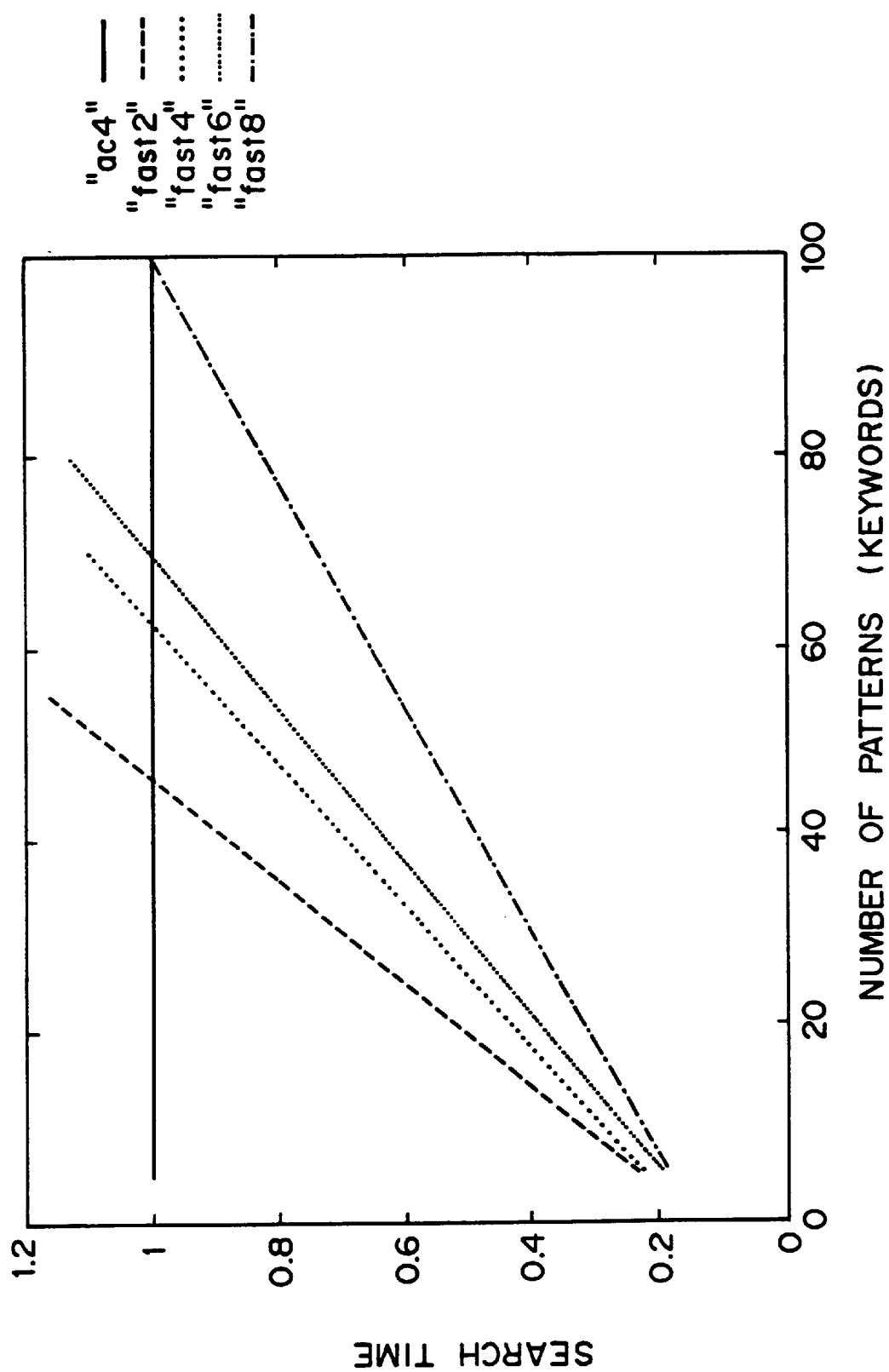
FIG. 17 is a graph showing a result of linearization of FIG. 16.

4) Approximating the result of 3) using the least square method (FIG. 17).

5) Estimating the boundary number of character strings to be searched using the Lagrange interpolation (FIG. 18).

Figure 19:
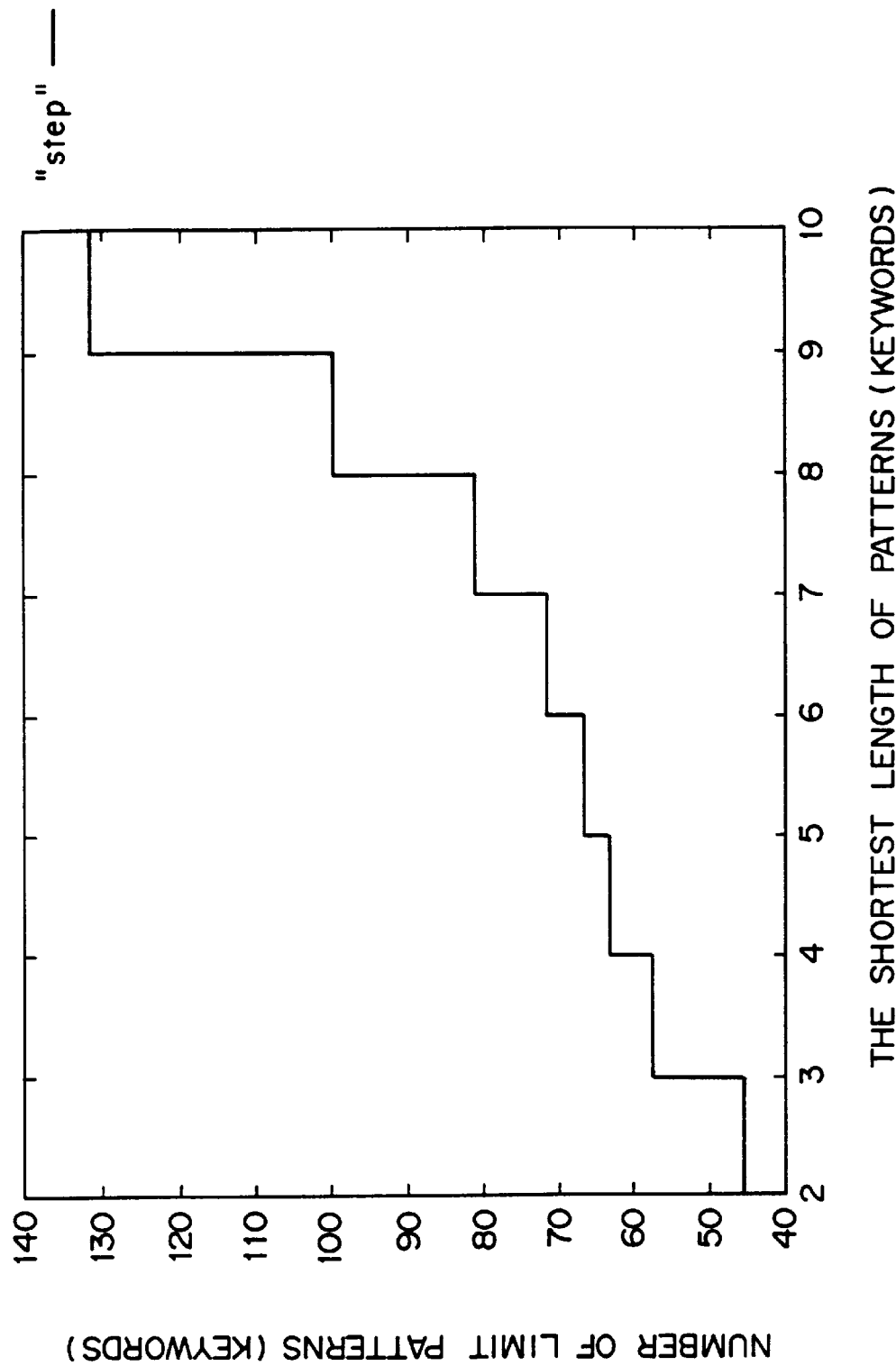
FIG. 19 is a graph showing a step function as a boundary number of character strings to searched (Chinese text)

6) Defining the step function g(L) according to the result of 5) (FIG. 19).

7) Defining the determination function as f (k, L)=k/g (L) according to g (L) in 6), assuming that an actual number of character strings to be searched is "k".

Let it be supposed that the determination function "f" is obtained in advance according to the above described process. In this case, if {价值观, 表甲式, 罢工, 安排角落} are provided as character strings to be searched for a certain Chinese text, the value of the determination function will be f (k, L)=k/g (L)=5/63.20<1, according to the length of the shortest character string to be searched L=4 bytes and the number of character strings to be searched k=5. As a result, the FAST method is selected as the pattern matching method in this case.

Provided next is the explanation about an embodiment of obtaining a determination function for English text. FIGS. 20 through 23, which correspond to FIGS. 12 through 15 with the Japanese text targeted, are intended to perform the following process for the English text, and obtain the determination function.

1) Preparing an English text to be searched (8.0 M bytes×10: Total 80 M bytes)

[Example] "Natural language interfaces enable the user to communicate with the computer in German, English or another language. Some applications of such interfaces are database queries, information retrieval from texts and so-called expert systems . . . "

2) Preparing a set of character strings to be searched by extracting from them the text to be searched prepared in 1) at random.

[Example] {you, message, Natural, Language, header, this, rmail, seeing, . . . }

Figure 20:
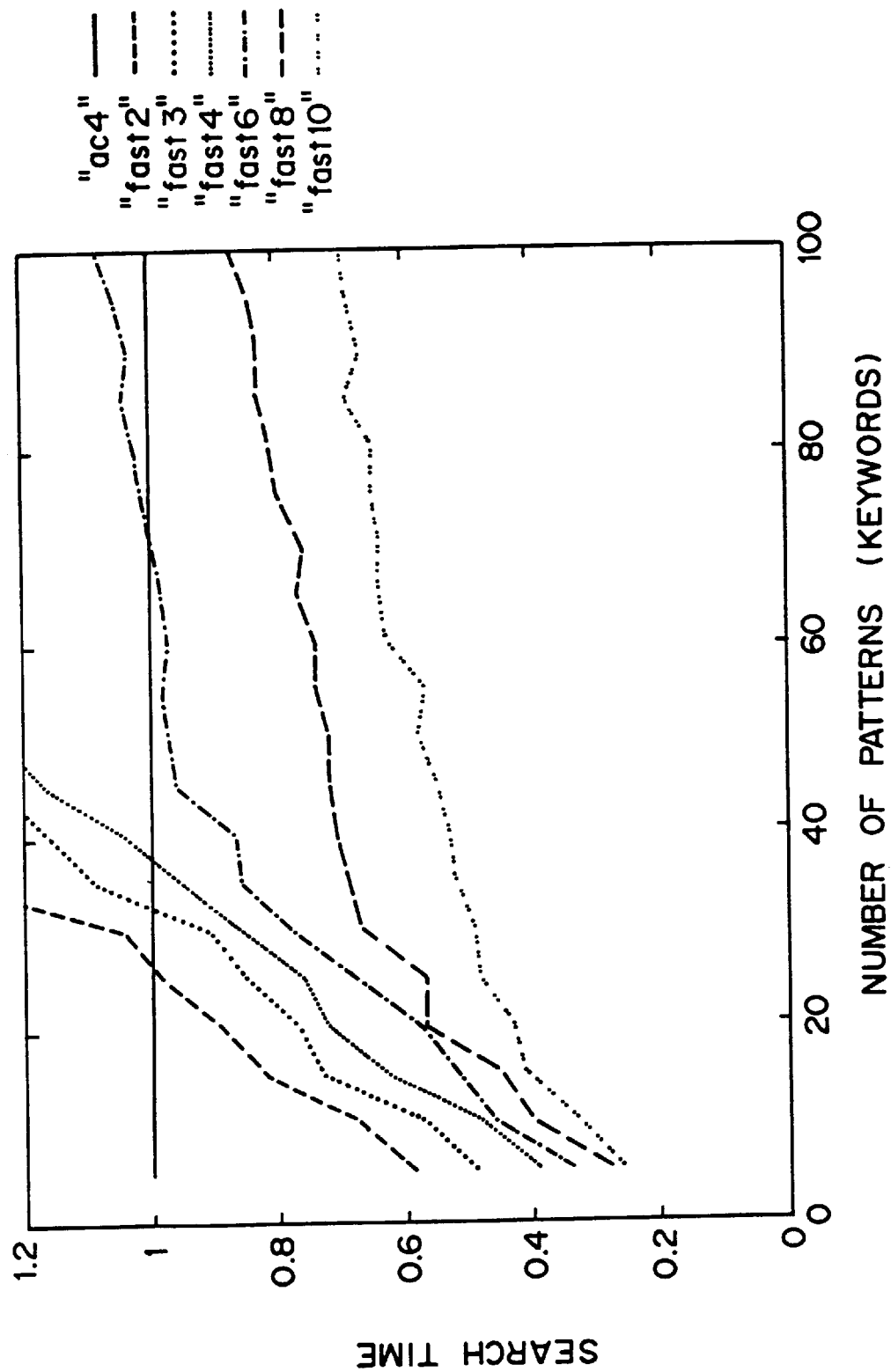
FIG. 20 is a graph showing a relationship between search times and the number of keywords according to the FAST method (English text)

3) Conducting a search experiment using 1) and 2) (FIG. 20)

Figure 21:
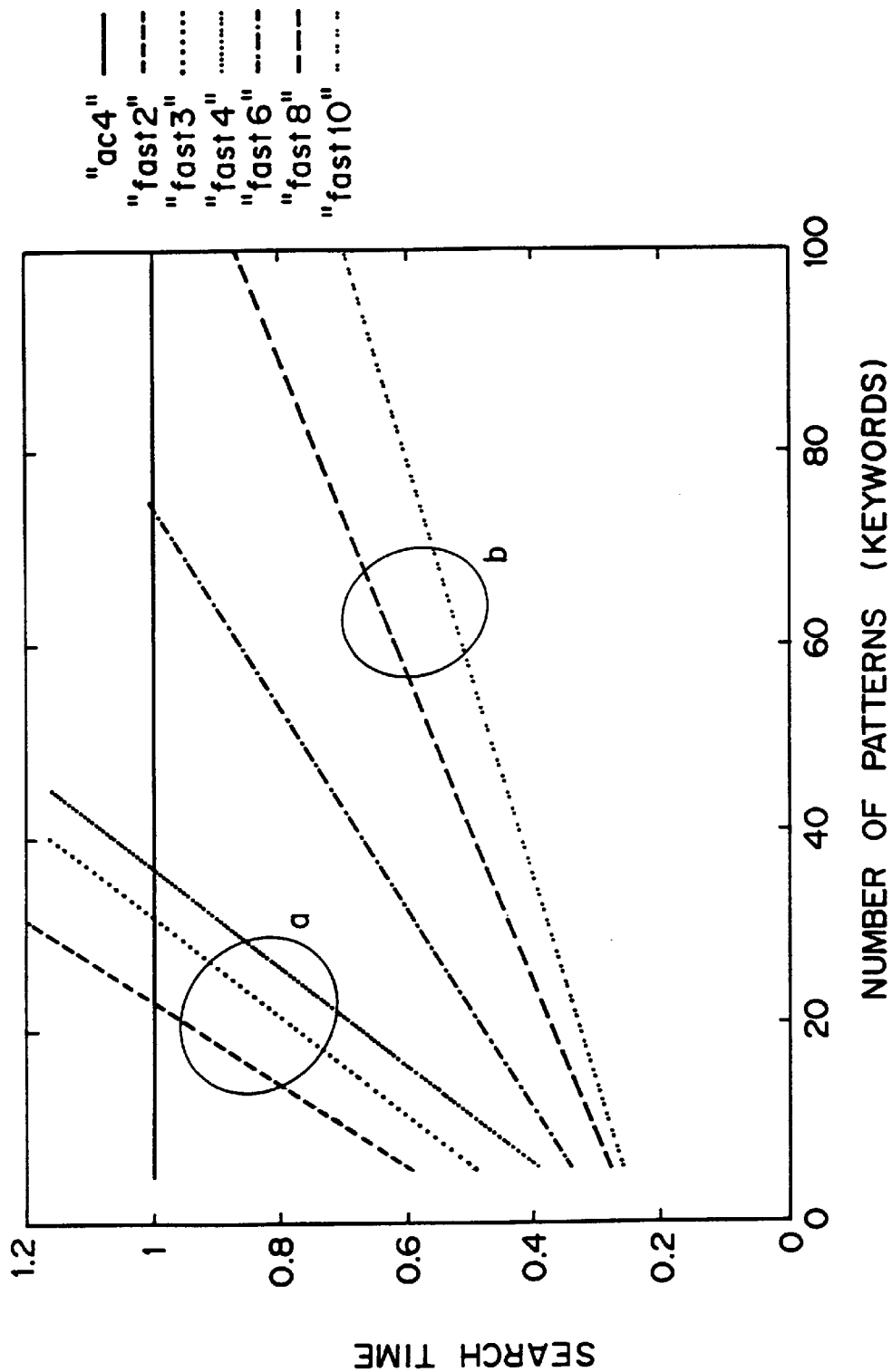
FIG. 21 is a graph showing a result of linearization of FIG. 20.

4) Approximating the result of 3) using the least square method (FIG. 21).

5) Estimating the boundary number of character strings to be searched using the Lagrange interpolation (FIG. 22).

Figure 23:
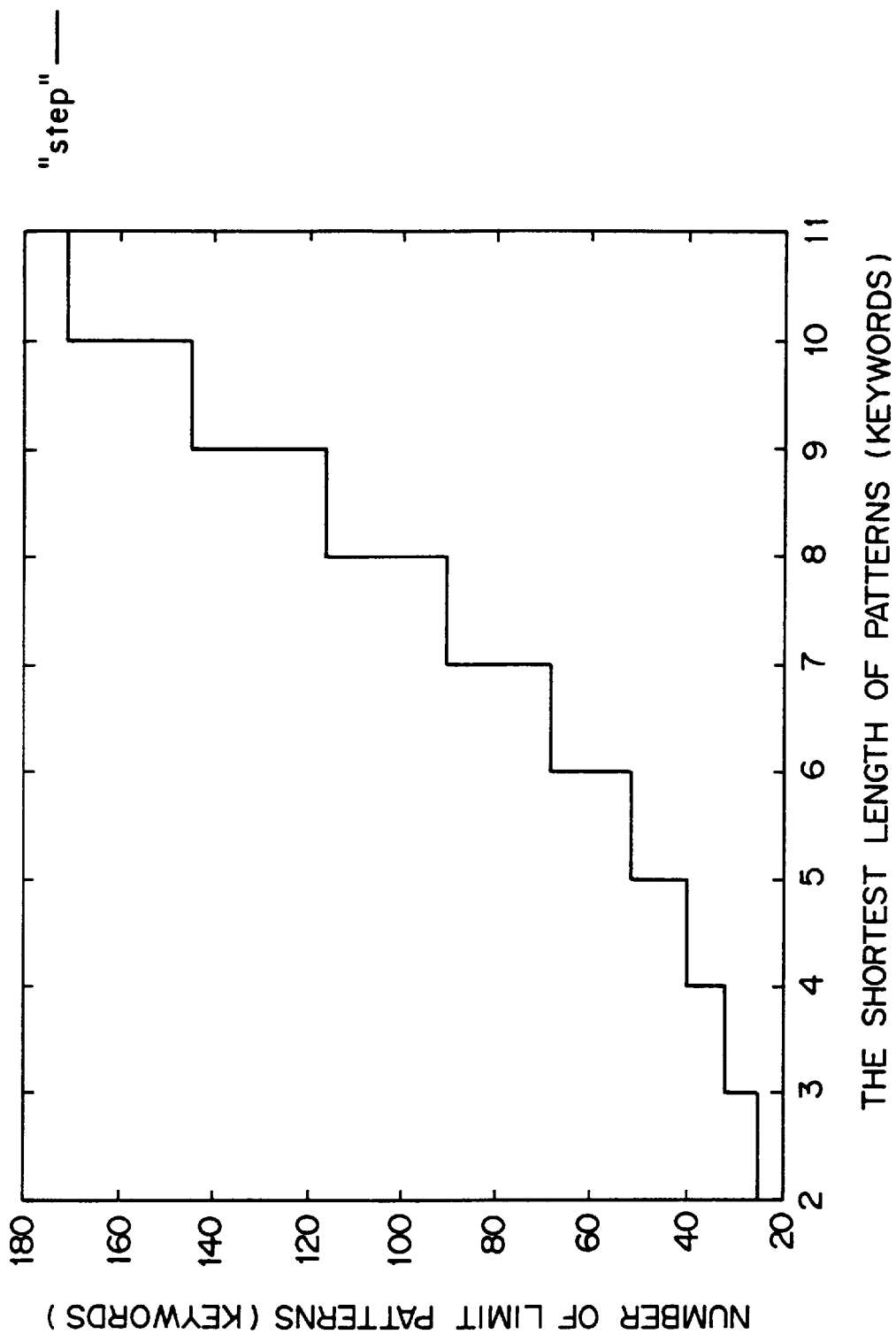
FIG. 23 is a graph showing a step function as a boundary number of character strings to be searched (for English text)

6) Defining the step function g (L) according to the result of 5) (FIG. 23).

7) Defining a determination function as f (k, L)=k/g (L) according to g(L) in 6), assuming that an actual number of character strings to be searched is Let it be supposed that the determination function "f" is obtained in advance according to the above described process. If character strings to be searched, for example, {computer, interface, language} are provided for a certain English text in this case, the value of the determination function will be f (k, L)=k/g (L)=3/116.76<1, according to the length of the shortest character string to be searched L=8 bytes and the number of character strings to be searched k=3. As a result, the FAST method is selected as the pattern matching method in this case.

Provided last is the explanation about an embodiment of obtaining a determination function for a program text to be targeted. FIGS. 24 through 27, which correspond to FIGS. 12 through 15 with the Japanese text targeted, are intended to perform the following process for the program text, and obtain the determination function.

1) Preparing a program text to be searched (7.8 M bytes×10: Total 78 M bytes).
[Example]

```
"       #include <stdio.h>
        int main(argc,argv)
        {
            int i, j;
            FILE *fp;
            . . .
            . . .
            . . ."
```

2) Preparing a set of character strings to be searched by extracting them from the text to be searched prepared in 1) at random.
[Example] {SC, eql, atoi, Macro, ALCERR, . . . }

Figure 24:
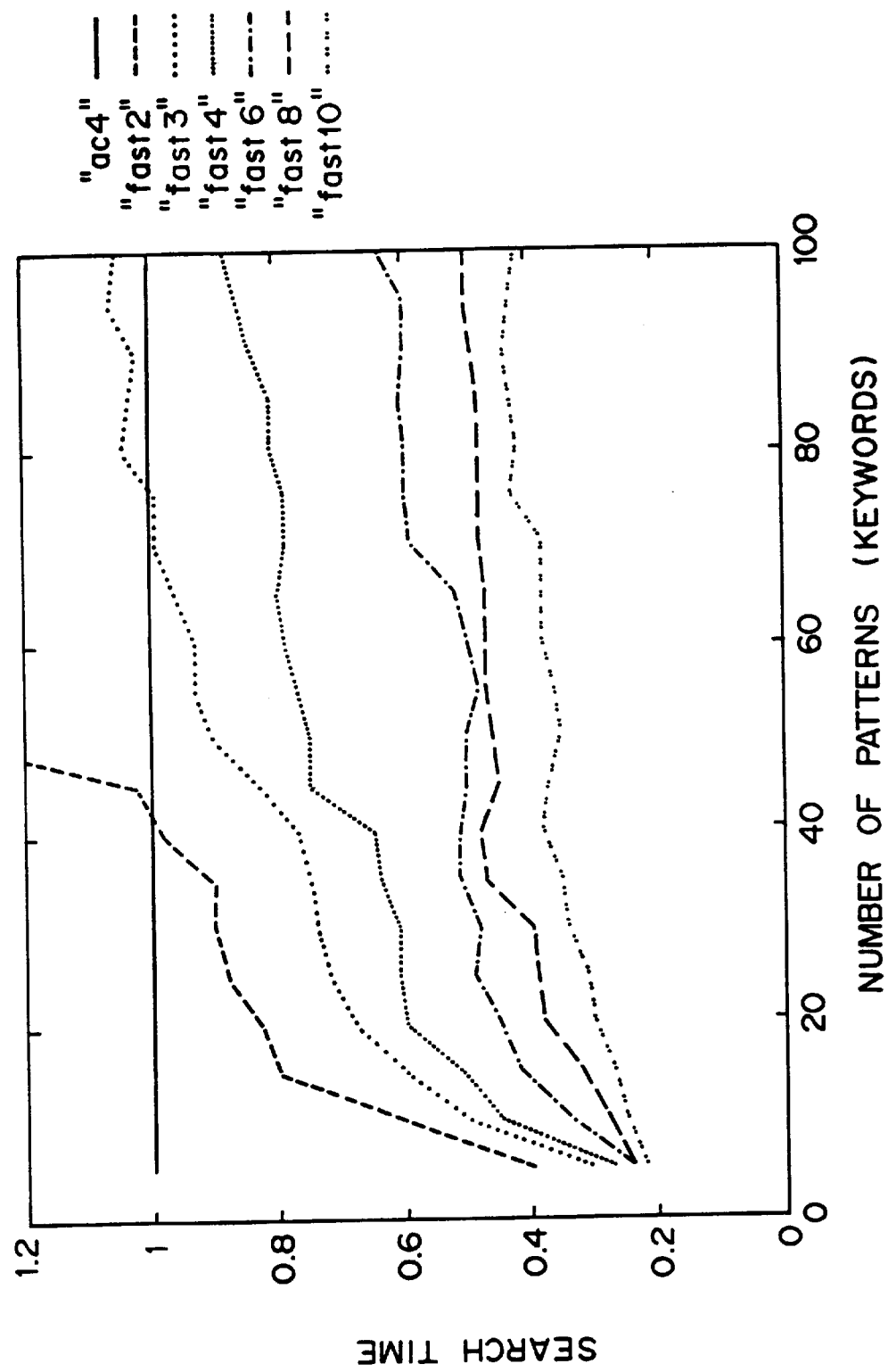
FIG. 24 is a graph showing a relationship between search times and the number of keywords according to the FAST method (program text)

3) Conducting a search experiment using 1) and 2) (FIG. 24).

Figure 25:
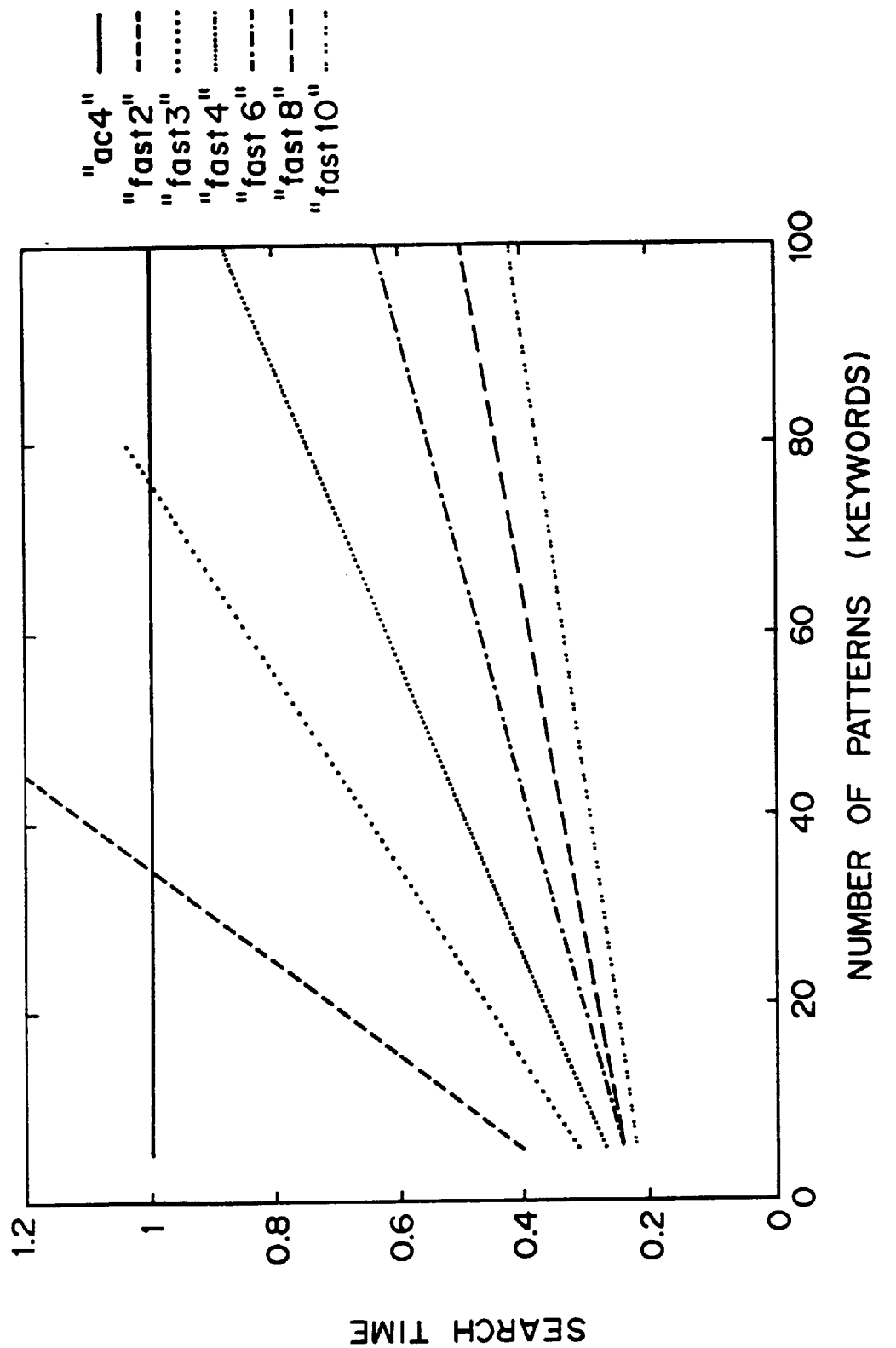
FIG. 25 is a graph showing a result of linearization of FIG. 24.

4) Approximating the result of 3) using the least square method (FIG. 25).

5) Estimating the boundary number of character strings to be searched using the Lagrange interpolation (FIG. 26).

Figure 27:
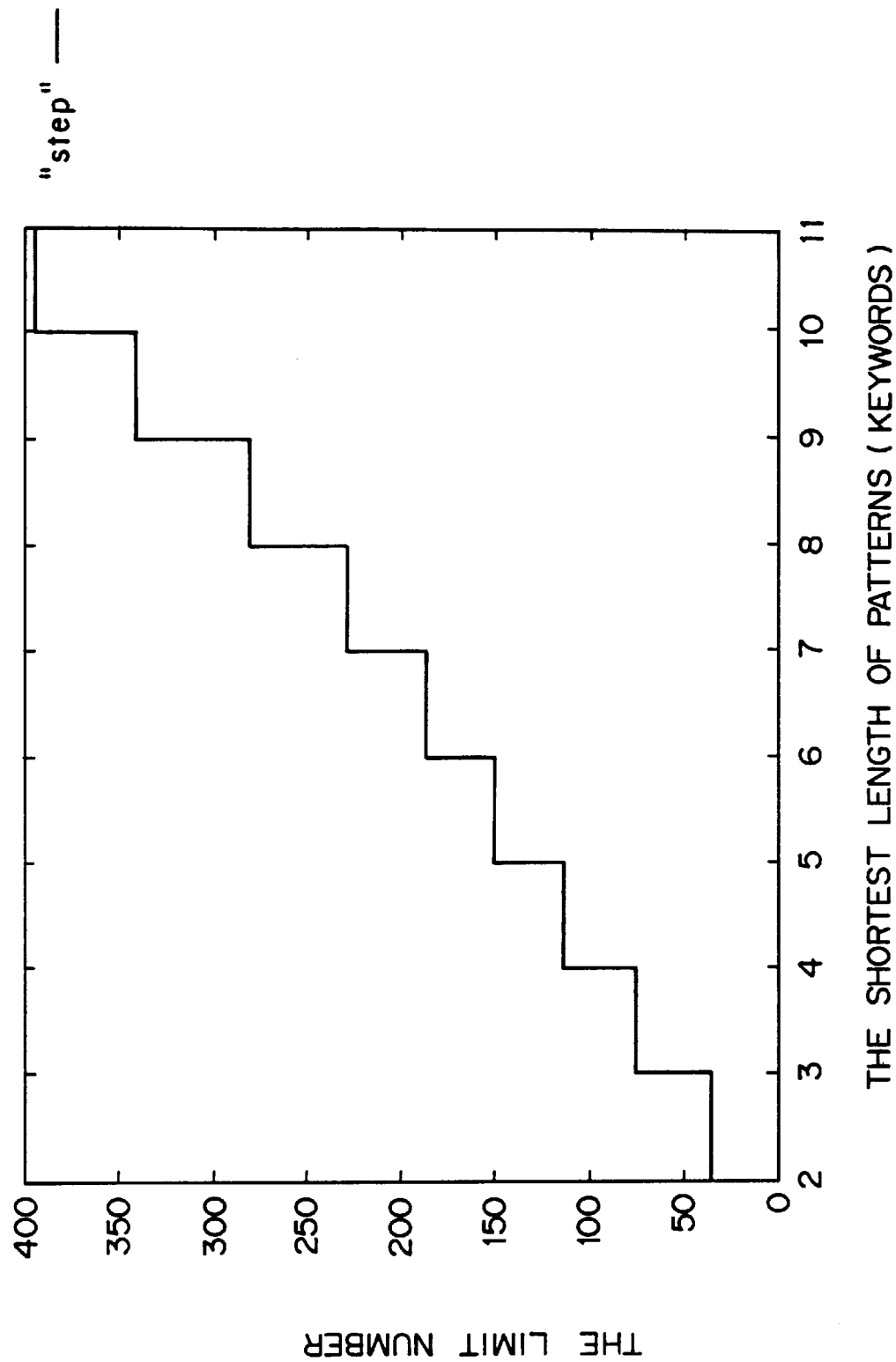
FIG. 27 is a graph showing a step function as a boundary number of character strings to be searched (program text)

6) Defining the step function g(L) according to the result of 5) (FIG. 27).

7) Defining a function which will be f (k, L)=k/g (L), assuming that an actual number of character strings to be searched is "k".

Let it be supposed that the determination function "f" is obtained in advance according to the above described process. If character strings to be searched, for example, {fprintf, int, unsigned, char} are provided for a certain program text in this case, the value of the determination function will be f (k, L)=k/g (L)=4/75.23<1, according to the length of the shortest character string to be searched L=3 bytes and the number of character strings to be searched k=4. As a result, the FAST method is selected as the pattern matching method in this case.

The result of the experiments shown in FIGS. 8 through 27 are obtained based on the assumption that the number of keywords included in each text is an average number. The size of each text form used for each of the experiments is 7–8 M bytes×10. Estimating that the capacity of an A4-sized page is 4–5 K bytes, the contents of the text will be a total amount of between 15,000 and 20,000 pages. Therefore, the entire contents of the text is not shown here.

The step functions in FIGS. 14, 18, 22, 26, and in FIGS. 15, 19, 23, and 27 illustrate that the results are dependent on the text forms. This is because the code types used in a text coded in 1 byte units such as an English or program text, etc. are limited definitely, unlike a text coded in 2 byte units such as a Japanese or Chinese text. Additionally, not only the difference in the number of code types used in each text, but also both the amount of vocabulary used in each text and a word description delimited by a space, affect the results of the step function.

Since the form of the determination function varies depending on a text form as described above, it is best to properly define determination functions for all text formats. If a language is explicitly identified, or predetermined for a text to be searched, it is possible to prepare a determination function for that language. However, if the language for the text to be searched cannot be identified, it is difficult to define or properly use determination functions for all languages, and at the same time, it is not practical.

It is known that the number of character types used in a text significantly affects an amount of search time using the FAST method. Here, let's take a look at the difference between a text coded in 1-byte units (English or program text) and a text coded in 2-byte units (Japanese or Chinese text), from a global point of view. There are the following differences between these texts.

1) If the length of the shortest character string to be searched is short (2–4 bytes), the boundary number of character strings in the 1-byte code text tends to be smaller than that in the 2-byte code text. (For example, each slope in the "a" portion of the graph shown in FIG. 21 (English text) is larger than that shown in FIG. 13 (Japanese text).

2) If the length of the shortest character string to be searched is long (8 bytes or more), the boundary number of character strings in the 1-byte code text tends to be larger than that in the 2-byte code text. (For example, each slope in the "b" portion of the graph shown in FIG. 21 (English text) is smaller than that shown in FIG. 13 (Japanese text).

3) Saturation of an amount of search time is caused by character strings to be searched in the 1-byte code text whose number is smaller than that in the 2-byte code text.

Considering the above described tendencies, it is proved that a boundary number of character strings which are commonly available for all languages to some extent, can be prototyped not by defining determination functions for all the languages, but by defining two determination functions for 1-byte and 2-byte code texts.

Accordingly, a determination function for English text is used as a determination function for 1-byte code text, while a determination function for Japanese text is used as a determination function for 2-byte code text, in this embodiment. They are regarded as determination functions for the text whose use frequencies are the highest in the respective 1-byte and 2-byte code texts among the four determination functions obtained so far. To implement the present invention, however, an experiment may be conducted for texts of some types, so that a determination function is defined using a text whose use frequency is the highest or a text whose use frequency is the lowest, in the respective 1-byte and 2-byte code texts.

The above provided explanation is based on the assumption that a text to be searched and a keyword are coded either in 1-byte units or in 2-byte units. However, if 1-byte and 2-byte codes can be mixed such as in the ASCII code or Shift-JIS code, a search using a text and a keyword including these two code types, can possibly be performed.

If characters coded in 1-byte units and 2-byte units are mixed, the boundary number of character strings to be searched varies depending on the ratios of the respective 1-byte and 2-byte codes in the text or keywords. Furthermore, it is not sufficient to obtain the ratios of the codes in the text prior to the search, considering the total amount of time. Accordingly, if the 1-byte and 2-byte codes are mixed, either of the determination functions for 1-byte and 2-byte code text is selected depending on the ratios of the codes in the keyword, in this embodiment.

Figure 28:
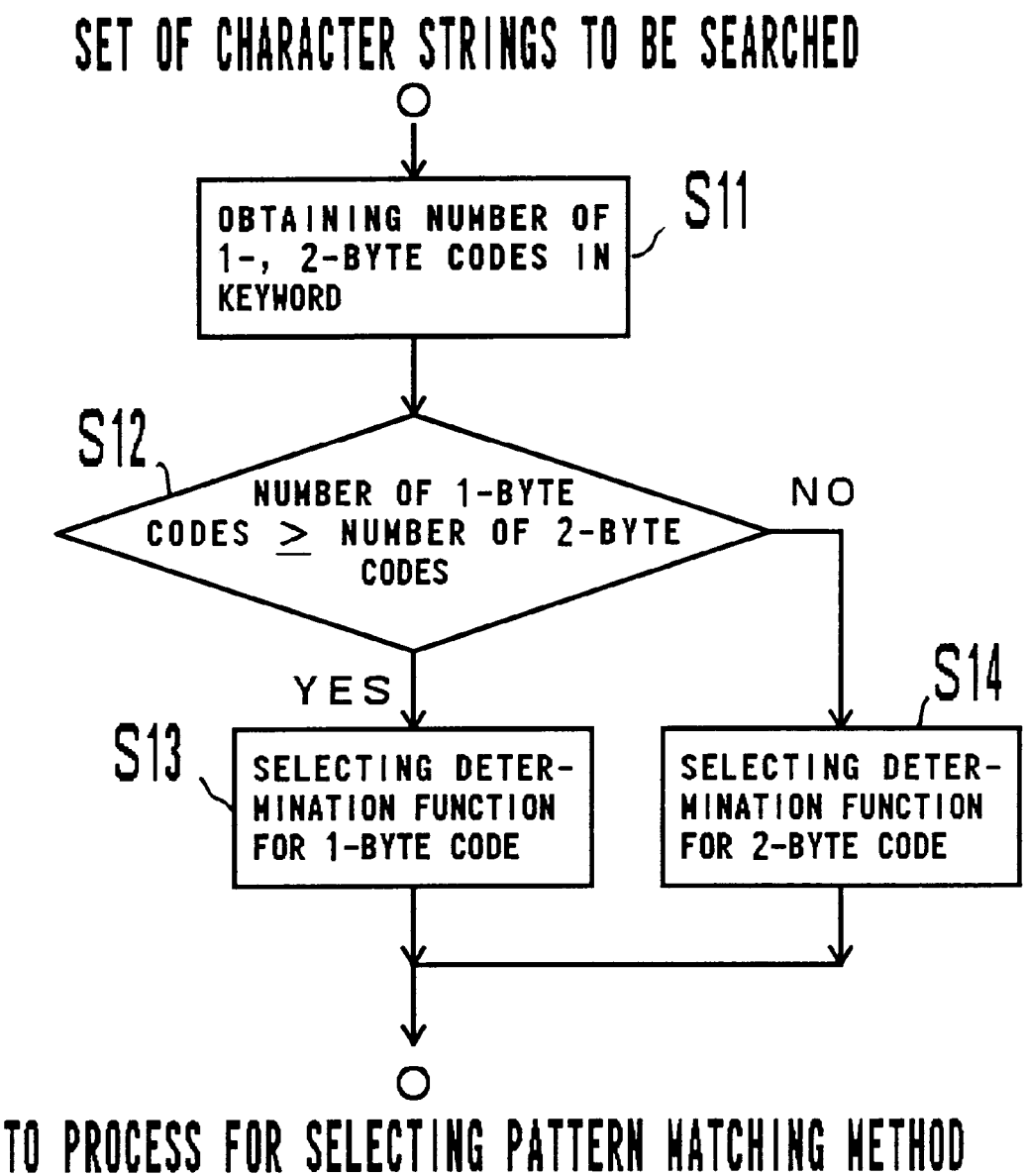
FIG. 28 is a flowchart showing a process for selecting a determination function.

FIG. 28 is a flowchart showing a process for selecting a determination function in this embodiment. The process shown in this figure is performed by the pattern matching method selecting unit 13 in FIG. 5 during the process for selecting a character string search method (step S4) shown in FIG. 7.

If a set of character strings to be searched, that is, a set of keywords, is provided in FIG. 28, the respective numbers of 1-byte and 2-byte code characters used in each of the character strings to be searched (keywords) are obtained in step S11. Then, a comparison is made between the number of 1-byte code characters and the number of 2-byte code characters included in the character string to be searched in step S12. If the number of 1-byte code characters is equal to or more than that of 2-byte code Characters (YES in S12), a determination function for the 1-byte code character is selected as the determination function "f" in step S13, and the process goes to step S5 in FIG. 7. If the number of 2-byte code characters is more than that of the 1-byte code characters (NO in S12), a determination function for the 2-byte code character is selected as the determination function "f" in step S14, and the process goes to step S5 in FIG. 7.

Performing this process during the process for selecting a character string search method in step S4 of FIG. 7 allows all of the cases in which a text to be searched and a character string to be searched are coded in 1 byte units, the case in which they are coded in 2-byte units only, and the case in which they are coded in both the 1-byte and 2-byte units, to be handled.

A specific example of a search in the case where 1-byte and 2-byte codes are mixed is provided below.

For example, if two keywords of 1-byte code and one keyword of 2-byte code {computer, interface, インタ, フェー, ス} are provided as character strings to be searched, the number of bytes of the 1-byte code used in the two keywords is 17 in total, while the number of bytes of the 2-byte code used in the one keyword is 14 in total. As a result, a determination function for the 1-byte code is selected according to the flowchart shown in FIG. 28. Since the length of the shortest character string to be searched is the string "computer" of 8 bytes, the boundary number of character strings to be searched will be 116.76 according to FIG. 22. As a result of f (k, L)=3/116.76<1 according to the flowchart shown in FIG. 7, the FAST method is selected as the pattern matching method.

If a keyword of 1-byte code and a keyword of 2-byte code {interface, インタ, フェー, ス} are provided as character strings to be searched, the number of bytes of the 1-byte code used in the first keyword is 9, while the number of bytes of the 2-byte code used in the second keyword is 14. Accordingly, a determination function for the 2-byte code is adopted according to the flowchart shown in FIG. 28. Additionally, since the length of the shortest character string to be searched is the string "interface" of 9 bytes, the boundary number of character strings will be 98.54 according to FIG. 14.

If two keywords including the 1-byte and 2-byte codes {inter フェー, ス, インタ face} are provided as character strings to be searched, the numbers of bytes of the 1-byte and 2-byte codes used in these two keywords are 9 and 14 respectively. As a result, the determination function for the 2-byte code is adopted according to the flowchart shown in FIG. 28. Additionally, the length of the shortest character string to be searched is the string "インタface" of 10 bytes, accordingly, the boundary number of character strings will be 119.98 according to FIG. 14.

If two keywords of 1-byte code and one keyword of 2-byte code {face, computer, コンピュータ} are provided as character strings to be searched, both the numbers of bytes of the 1-byte and 2-byte codes used in the keywords are 12. Accordingly, the determination function for 1-byte code is selected according to the flowchart shown in FIG. 28. Since the length of the shortest character string to be searched is the string "face" of 4 bytes, the boundary number of character strings will be 39.97 according to FIG. 22.

Figure 29:
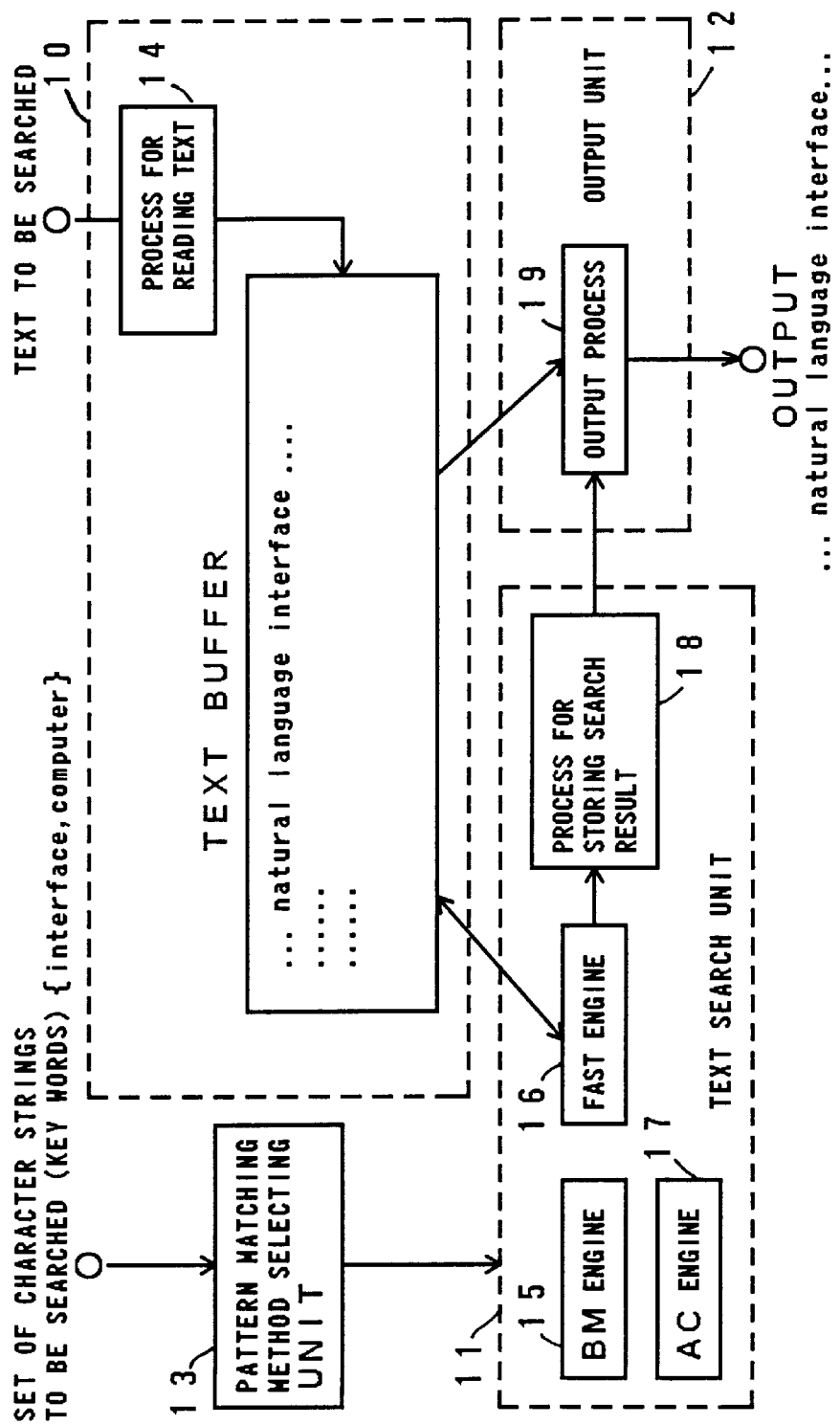
FIG. 29 is a detailed block diagram of FIG. 5.

FIG. 29 is a block diagram showing a flow of a process performed in the search apparatus according to this embodiment.

This figure shows the flow of the process performed in the case in which English text is provided as a text to be searched, and keywords "interface" and "computer" are provided as character strings to be searched. When the text to be searched is provided from the auxiliary storage apparatus 2, etc. to the search apparatus, this text data is read into the text buffer 10 included in the main storage 7, as a process for reading a text 14. Additionally, the pattern matching method selecting unit 13 selects an optimum character string selecting method using the process for selecting a character string search method shown in FIGS. 7 and 28, from a set of character strings to be searched provided by the input apparatus 3 such as a keyboard, etc. or the auxiliary storage apparatus 2. Then, the selected result and the set of character strings to be searched are passed to the text search unit 11. The text search unit 11 uses any of search engines 15, 16, and 17 according to the respective BM, FAST, and AC methods, which is selected by the pattern matching method selecting unit 13, to scan the text read into the text buffer 10 and perform a search process. If any of the character strings to be searched is found at this time, the text search unit 11 stores the location in the text in the main storage 7, as a process for storing a search result 18. After the text search unit 11 completes the search process, the output unit 12 performs an output process 19 based on the search result stored by the text search unit 11.

Provided above is the explanation about the case in which a pattern search is performed according to the present invention. The present invention, however, does not perform a mere pattern search. It may replace a searched pattern with another pattern. Provided below is an example of making a replacement.

Figure 30:
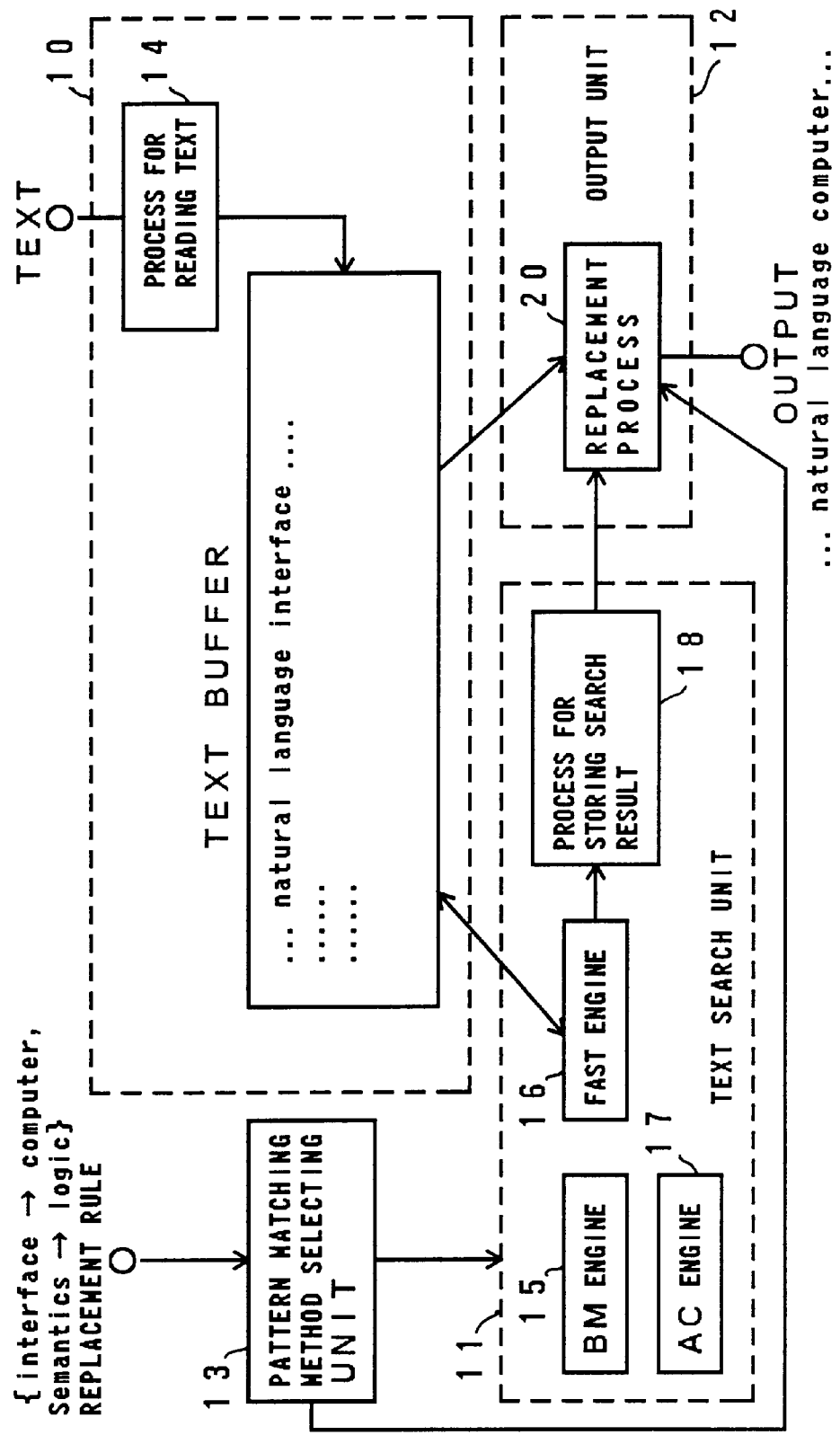
FIG. 30 is a block diagram showing the basic configuration of a character string search apparatus.

FIG. 30 is a block diagram showing the basic configuration and a process flow of a character string replacing apparatus according to this embodiment. This figure corresponds to FIG. 29, and corresponding blocks are denoted by the same reference numerals as those shown in FIG. 29.

In the search apparatus shown in FIG. 29 and the replacing device shown in FIG. 30, the pattern matching method selecting unit 13 and the output unit 12 are configured as follows.

The pattern matching method selecting unit 13 prepares a working area in the main storage 7, and analyzes a set of character strings to be searched (a set of keywords) (selects a determination function and calculates information required for matching a pattern) included in a replacement rule provided by the auxiliary storage apparatus 2 or the input apparatus 3. If then selects an optimum matching method from the analysis result.

The replacement rule is provided as a pair of a character string to be searched and a character string to be replaced. A replacement table is created in the main storage 7 based on this rule. The replacement table is referenced by a replacement process included in the output unit 12.

The output unit 12 prepares a working area in the main storage 7, and includes a replacement process 20 instead of an output process 19 shown in FIG. 29. The replacement process 20 references the replacement table created by the pattern matching method selecting unit 13, text data included in the text buffer 10 in the main storage 7, and the result of a search performed by the text search unit 11, and replaces the character string to be searched with the character string to be replaced.

The replacement process 20 copies text data preceding a location at which the character string to be searched exists to the working area, replaces the character string to be searched with the character string to be replaced based on the replacement table, and writes the replaced character string to the working area. Then, it copies text data preceding the location at which the next character string to be searched exists, and performs a similar process. It outputs the contents of the working area to the auxiliary storage apparatus 2 or the display 4, when the working area becomes full or the replacement process is completed.

FIG. 30 shows a flow of a process performed in the case in which an English text is provided as a text to be searched, and two pairs of a character string to be searched and a character string to be replaced, that is, a pair of "interface" and "computer", and a pair of "Semantics" and "logic" as the replacement rules. If the text to be searched is provided from the auxiliary storage apparatus 2, etc. to the search apparatus, the text is read into the text buffer 10 prepared in the main storage 7, as a process for reading a text 14. The pattern matching method selecting unit 13 selects an optimum character string search method from a set of character strings to be searched which is included in a replacement rule and provided by the input apparatus 3 such as a keyboard, etc. or the auxiliary storage apparatus 2, using the process for selecting a character string search method shown in FIGS. 7 and 28. Then, the selected result and the set of character strings to be searched are passed to the text search unit 11. Furthermore, the replacement rule is passed to the output unit 12. The text search unit 11 uses any of the search engine 15 according to the BM method, the search engine 16 according to the FAST method, and the search engine 17 according to the AC method, which corresponds to the method selected by the pattern matching method selecting unit 13. This unit then scans the text read into the text buffer 10, and performs a search process. If the character string to be searched is found at this time, the location at which the character string to be searched is found is stored in the main storage 7, as a process for storing a search result 18. After the text search unit 11 completes the search process, the output unit 12 performs the replacement process 20 based on the search result stored by the text search unit 11 and the replacement rule provided by the pattern matching method selecting unit 13. The replacement process 20 replaces the character string to be searched "interface" with the character string to be replaced "computer" in the text according to the replacement rule, and performs an output, for example, in FIG. 30.

FIG. 31 is a flowchart showing a process performed by the replacement process 20 and this specific example.

Figure 31A:
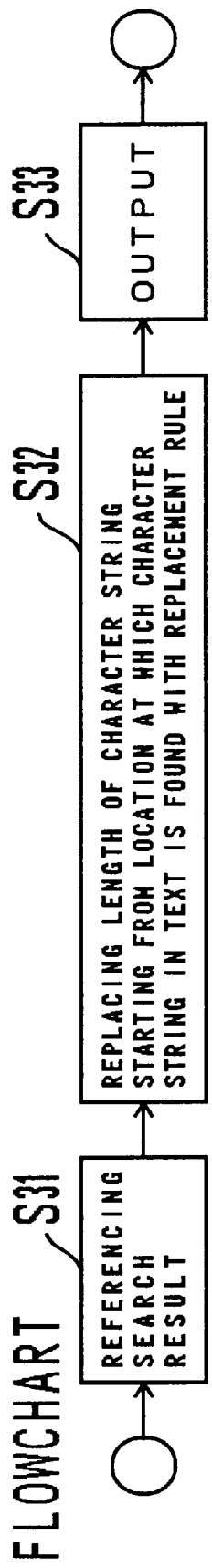
Figure 31B:
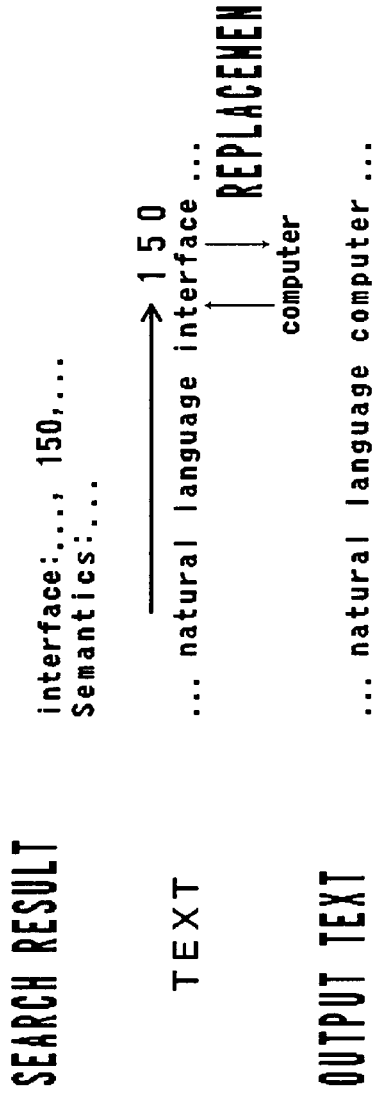
FIG. 31B shows its embodiment.

In step S31 in FIG. 31A, the replacement process 20 references the result of the search process which is performed by the text search unit 11 and stored in the main storage 7. This search result indicates that the character string to be searched "interface" exists at the 150th byte in the text as shown in FIG. 31B. Then, the replacement process 20 replaces the length of the character string to be searched starting from the location at which the character string is found in the text, with the replacement rule in step S32. In FIG. 31B, the replacement process 20 replaces the character string to be searched "interface" existing at the 150th byte in the text, with the character string to be replaced "computer". Lastly, the text in which the replacement is made is output to the auxiliary storage apparatus 2 or the display 4 in step S33. In FIG. 31B, the text prior to the replacement ". . . natural language interface . . . " is replaced with the ". . . natural language computer . . . ", and output.

Provided next is the explanation about an example of searching keywords for a Japanese text, by referring to FIG. 32A and FIG. 32B. Here, assume that three character strings "技術協力", "技術動向", and "技術交流", are specified as keywords, and the text shown in FIG. 32B is provided as the Japanese text to be searched.

First of all, the above described text to be searched is provided to the text buffer 10 as shown in FIG. 32A. The pattern matching method selecting unit 13 selects an optimum pattern matching method corresponding to the set of keywords {技術協力, 技術動向, 技術交流}. The number of keywords "k" is 3, and the length of the shortest keyword "L" is 4 characters respectively composed of 2-byte code, that is, 8 bytes. Since all of the keywords are composed of 2-byte code, the value of the determination function "f" is determined to be 3/85.01, which is smaller than "1", according to the table shown in FIG. 14, in the process for selecting a character string of FIG. 7 in the process for selecting a determination function of FIG. 28. As a result, the FAST method is selected in step S6 in FIG. 7.

This select of search method is transmitted to the text search unit 11, and the locations of the keywords are searched for the text. In this case, the locations at the 53rd, 215th, 290th, 332nd, ... byte from the beginning of the text are found, and the search result is transmitted to the output unit 12. A return code which does not appear in the above described text corresponds to 1-byte length.

The output unit 12 performs a process required for the search result according to a user request, and outputs the result of the process. If replacement rules for replacing 技術協力 with X X X, 技術動向 with Y Y Y, and 技術交流 with Z Z Z are provided from the user as shown in FIG. 32A, corresponding keywords in the text are replaced using the specified replacement rules, and output to the user.

FIG. 33A is a schematic diagram showing an example of searching keywords for the English text shown in FIG. 33B.

A process similar to that of FIG. 32A and FIG. 32B are performed in this case, but the number of keywords is 3, and the length of the shortest keyword among the keywords is 5 characters respectively composed of 1-byte code, that is, 5 bytes. Since all of the keywords are composed of 1-byte code, the value of the determination function "f " is determined to be 3/51.55 according to the table shown in FIG. 22, which is smaller than "1", in the process for selecting a character string search method shown in FIGS. 7 and 28. As a result, the FAST method is selected in step S6 of FIG. 7.

The text search unit 11 finds the locations of the keywords at 18th, 69th, 107th, 149th, ... byte from the beginning of the text (note that the return code of 1 byte follows the last word "or" in the first line). The keywords are replaced using the replacement rules specified by the user according to the search result, and the result is output to the user.

As described above in detail, a search method with high speed is automatically selected for a search target based on a pattern to be searched, in order to find the pattern to be searched in the search target, according to the present invention. Specifically, an optimum search method can automatically be selected for a language in which the text to be searched is written and is in a form such as a used code, etc., based on a keyword, in order to search a character string to be searched (keyword) in a text. It significantly improves the character string search speed. Furthermore, a search speed suitable for the number of keywords can be realized, if the number of keywords is only one in a word processor, etc., or if the number of keywords is large in a database of a large size. Still further, it eliminates the need for considering the number of keywords to be searched at one time by a user, thereby reducing the user load.

What is claimed is:

1. A pattern search apparatus, to which a search target and a search pattern to be found in the search target are provided, for finding the search pattern in the search target, comprising:

a search method selecting unit automatically and variably selecting one of a plurality of search methods, in correspondence with a search condition on which a search using the search pattern is performed; and a search unit finding the search pattern in the search target using a search method selected by said search method selecting unit, wherein the one of the plurality of search methods is selected based upon a comparison between the plurality of search methods.

2. The pattern search apparatus according to claim 1, wherein:

the search target is a text comprising character strings, and the search pattern is a keyword comprising a character string.

3. The pattern search apparatus according to claim 2, wherein:

the search condition is based on the keyword.

4. The pattern search apparatus according to claim 3, wherein:

the search condition includes a number of keywords, and a specification of a length of a shortest keyword among at least one of the keywords.

5. The pattern search apparatus according to claim 4, wherein:

said search method selecting unit selects any of the Boyer-Moore, Aho-Corasick, and FAST methods, as the search method.

6. The pattern search apparatus according to claim 5, wherein:

said search method selecting unit selects the Boyer-Moore method as the search method, on the search condition that the number of keywords is 1 and the length of the keyword is at least 2 bytes.

7. The pattern search apparatus according to claim 5, wherein:

said search method selecting unit selects the Aho-Corasick method as the search method, on the search condition that the length of the shortest keyword among the keywords is 1 byte.

8. The pattern search apparatus according to claim 5, wherein:

said search method selecting unit evaluates a determination function, and selects either of the Aho-Corasick and FAST methods according to a result of the evaluation, on the search condition that the number of keywords is plural (two or more), and the length of the shortest keyword among the keywords is 2 bytes or more.

9. The pattern search apparatus according to claim 8, wherein:

said search method selecting unit selects the FAST method if the value of the determination function is less than 1, and selects the Aho-Corasick method if the value of the determination function is equal to or greater than 1, when the determination function is provided as a ratio "k/K" of the number of keywords "k" included in the search condition to a normal experimental value "K" of the number of keywords in a boundary at which an amount of search time according to the Aho-Corasick method is longer than an amount of search time according to the FAST method, in correspondence with the length of the shortest keyword "L" among the keywords.

10. The pattern search apparatus according to claim 8, wherein:

the determination function is selected for each text form of the character string.

11. The pattern search apparatus according to claim 10, wherein:

a text form of the character string is a description language of the character string.

12. The pattern search apparatus according to claim 8, wherein:

a ratio of each of code types in the keyword is further included as the search condition.

13. The pattern search apparatus according to claim 12, wherein:

the code types are 1-byte code and 2-byte code.

14. The pattern search apparatus according to claim 12, wherein:

the determination function is implemented for each of the code types.

15. The pattern search apparatus according to claim 14, wherein:

the determination function is selected based on the ratio of each of the code types.

16. The pattern search apparatus according to claim 1, further comprising:

a storage unit storing the search target, wherein said search unit performs a search for the search target stored in said storage unit.

17. The pattern search apparatus according to claim 1, further comprising:

an output unit performing an output based on a result of a search performed by said search unit.

18. The pattern search apparatus according to claim 17, wherein:

said output unit uses the result of the search performed by said search unit, replaces the search pattern in the search target with a pattern corresponding to each search pattern, and performs an output based on a result of a replacement performed by said search unit.

19. A pattern search apparatus, to which a search target and a search pattern to be found in the search target are provided, for finding the search pattern in the search target, comprising:

a storage unit storing the search target;

a search method selecting unit automatically and variably selecting one of a plurality of search methods, in correspondence with a search condition on which a search using the search pattern is performed;

a search unit finding the search pattern in the search target stored in a said storage unit, using a search method selected by said search method selecting unit; and an output unit outputting a result of a search performed by said search unit, wherein the one of the plurality of search methods is selected based upon a comparison between the plurality of search methods.

20. A search pattern method for finding a search pattern in a search target, to which the search target and the search pattern to be found in the search target are provided, comprising the steps of:

receiving a search condition on which the search pattern is found; and automatically and variably selecting one of a plurality of search methods in correspondence with the search condition, wherein the one of the plurality of search methods is selected based upon a comparison between the plurality of search methods.

21. The pattern search method according to claim 20, wherein:

the search target is a text comprising character strings, and the search pattern is a keyword comprising a character string.

22. The pattern search method according to claim 21, wherein:

the search condition is based on the keyword.

23. The pattern search method according to claim 22, wherein:

the search condition includes a number of keywords as search patterns, and a specification of a length of a shortest keyword among the keywords.

24. The pattern search method according to claim 23, wherein:

any of the Boyer-Moore, Aho-Corasick, and FAST methods is selected as a search method.

25. A computer-readable storage medium used to make a computer perform, when used in the computer to which a search target and a search pattern to be found in the search target are provided, for finding the search pattern in the search target, the functions of:

receiving a search condition on which a search using the search pattern is performed; and automatically and variably selecting one of a plurality of search methods in correspondence with the search condition, wherein the one of the plurality of search methods is selected based upon a comparison between the plurality of search methods.

26. The computer-readable storage medium according to claim 25, wherein:

the search target is a text comprising character strings, and the search pattern is a keyword comprising a character string.

27. The computer-readable storage medium according to claim 26, wherein: the search condition is based on the keyword.

28. The computer-readable storage medium according to claim 27, wherein:

the search condition includes a number of keywords, and a specification of a length of a shortest keyword among the keywords.

29. The computer-readable storage medium according to claim 28, wherein:

any of the Boyer-Moore, Aho-Corasick, and FAST methods is selected as a search method.

* * * * *